US012222336B2

(12) United States Patent
Aono et al.

(10) Patent No.: US 12,222,336 B2
(45) Date of Patent: Feb. 11, 2025

(54) SAMPLE INTRODUCTION DEVICE

(71) Applicant: SHIMADZU CORPORATION, Kyoto (JP)

(72) Inventors: Akira Aono, Kyoto (JP); Shota Hata, Kyoto (JP); Naru Maruoka, Kyoto (JP); Hideki Sato, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 0 days.

(21) Appl. No.: 17/641,679

(22) PCT Filed: Nov. 18, 2020

(86) PCT No.: PCT/JP2020/043036
§ 371 (c)(1),
(2) Date: Mar. 9, 2022

(87) PCT Pub. No.: WO2021/111881
PCT Pub. Date: Jun. 10, 2021

(65) Prior Publication Data
US 2022/0326195 A1    Oct. 13, 2022

(30) Foreign Application Priority Data

Dec. 5, 2019  (WO) .................. PCT/JP2019/047647

(51) Int. Cl.
*G01N 30/20* (2006.01)
*G01N 30/26* (2006.01)
*G01N 30/88* (2006.01)

(52) U.S. Cl.
CPC .............. *G01N 30/20* (2013.01); *G01N 30/26* (2013.01); *G01N 30/88* (2013.01); *G01N 2030/201* (2013.01)

(58) Field of Classification Search
CPC ........ G01N 30/20; G01N 30/26; G01N 30/88; G01N 2030/201; G01N 30/16; G01N 30/12; G01N 2030/167
(Continued)

(56) References Cited

U.S. PATENT DOCUMENTS

2010/0107730 A1    5/2010   Aono

FOREIGN PATENT DOCUMENTS

JP    2010-112761 A    5/2010
JP       3159793 U     6/2010
(Continued)

OTHER PUBLICATIONS

International Search Report for PCT/JP2020/043036 dated Feb. 9, 2021.
(Continued)

*Primary Examiner* — Robert R Raevis
(74) *Attorney, Agent, or Firm* — Sughrue Mion, PLLC

(57) ABSTRACT

A switching mechanism 110 can perform switching to a pressurized state in which gas is supplied from a pipe 203 to an insertion tube 101, or a derivation state in which gas in a head space 23 that is pressurized is derived from the insertion tube 101 to the pipe 207 via a collection unit 104. The switching mechanism 110 includes a discharge valve 103 that puts the insertion tube 101 and the pipe 207 into a non-communication state in the pressurized state and puts the insertion tube 101 and the pipe 207 into a communication state in the derivation state. A resistance pipe 206 supplies gas to a channel between the collection unit 104 and the discharge valve 103 in the derivation state.

15 Claims, 16 Drawing Sheets

(58) Field of Classification Search
USPC ............ 422/83, 89; 73/23.41, 23.42, 863.12,
73/863.71, 863.72, 864.81, 864.83, 40,
73/5 R, 46
See application file for complete search history.

(56) References Cited

FOREIGN PATENT DOCUMENTS

| | | | |
|---|---|---|---|
| JP | 2016-114456 A | | 6/2016 |
| JP | 2016114456 | * | 6/2016 |

OTHER PUBLICATIONS

International Search Report for PCT/JP2019/047647 dated Mar. 10, 2020.
Written Opinion for PCT/JP2020/043036 dated Feb. 9, 2021.
Written Opinion for PCT/JP2019/047647 dated Mar. 10, 2020.
Extended European Search Report issued Nov. 29, 2023 in European Application No. 20895813.2.

* cited by examiner

SAMPLE INTRODUCTION DEVICE

CROSS REFERENCE TO RELATED APPLICATIONS

This application is a National Stage of International Application No. PCT/JP2020/043036 filed Nov. 18, 2020, claiming priority based on International Patent Application No. PCT/JP2019/047647 filed Dec. 5, 2019.

TECHNICAL FIELD

The present invention relates to a sample introduction device.

BACKGROUND ART

For example, in a head-space type sample introduction device as exemplified in Patent Document 1 below, when a sample container containing a sample is heated, a component in the sample is vaporized, and the vaporized component is stored in a space (head space) in an upper portion in the sample container. Then, an insertion tube is inserted into the head space, and gas is supplied into the sample container through the insertion tube, so that the head space is pressurized.

After the head space is pressurized in this way, when the supply of gas into the sample container is stopped, the vaporized component is derived from the head space to the outside of the sample container by the pressure in the head space. A component in the gas derived from the head space is collected in a collection unit. After that, the component collected in the collection unit is sent to a gas chromatograph for detection.

PRIOR ART DOCUMENTS

Patent Documents

Patent Document 1: Japanese Patent Laid-Open No. 2010-112761

SUMMARY OF THE INVENTION

Problems to be Solved by the Invention

The gas derived from the head space is discharged to a discharge pipe through the collection unit. At this time, a component in the gas that is not collected in the collection unit is discharged through the discharge pipe. Normally, a part of a channel leading to the discharge pipe is not heated. For this reason, a part of components in the gas that has passed through the collection unit is likely to be adsorbed on a wall surface of the channel, a discharge valve provided on the channel, or the like, and remain.

Even in a case where a component in the gas remains in the channel as described above, if the pressure of the gas derived from the head space is high, the remaining component is unlikely to diffuse to the collection unit side. However, the pressure of the gas derived from the head space gradually decreases over time. For this reason, immediately before the end of derivation of the gas from the head space, the pressure of the gas decreases, and there is possibility that a component remaining in the channel diffuses to the collection unit side.

In this case, a component remaining in the channel at the time of previous analysis may be carried over by diffusing to the collection unit side, which may lead to decrease in analysis accuracy. In particular, in a case where analysis of a low-concentration sample or blank analysis is performed after analysis using a high-concentration sample is performed, a component of the high-concentration sample is likely to remain in the channel and an adverse effect due to carryover of the remaining component is likely to be generated.

The present invention has been made in view of the above circumstances, and an object of the present invention is to provide a sample introduction device capable of preventing a component remaining in a channel from diffusing to the collection unit side.

Means for Solving the Problems

A first aspect of the present invention is a sample introduction device including an insertion tube, a gas supply pipe, a collection unit, a discharge pipe, a switching mechanism, and an additional channel. The intubation tube is inserted into a head space of a sample container. The gas supply pipe can communicate with the insertion tube, and pressurizes the head space to a predetermined pressure by supplying gas into the sample container via the insertion tube. The collection unit can communicate with the insertion tube and collects a component in gas derived from the head space. The discharge pipe can communicate with the insertion tube via the collection unit. The switching mechanism can perform switching to a pressurized state in which gas is supplied from the gas supply pipe to the insertion tube, or a derivation state in which gas in the head space that is pressurized is derived from the insertion tube to the discharge pipe via the collection unit. The switching mechanism includes a discharge valve that puts the insertion tube and the discharge pipe into a non-communication state in the pressurized state, and puts the insertion tube and the discharge pipe into a communication state in the derivation state. The additional channel supplies gas to a channel between the collection unit and the discharge valve in the derivation state.

Effects of the Invention

According to the first aspect of the present invention, it is possible to prevent a component remaining in a channel from diffusing to the collection unit side by gas supplied from the additional channel in the derivation state in which gas in the pressurized head space is derived from the insertion tube to the discharge pipe via the collection unit.

MODE FOR CARRYING OUT THE INVENTION

1. Configuration of Sample Introduction Device

Figure 1:
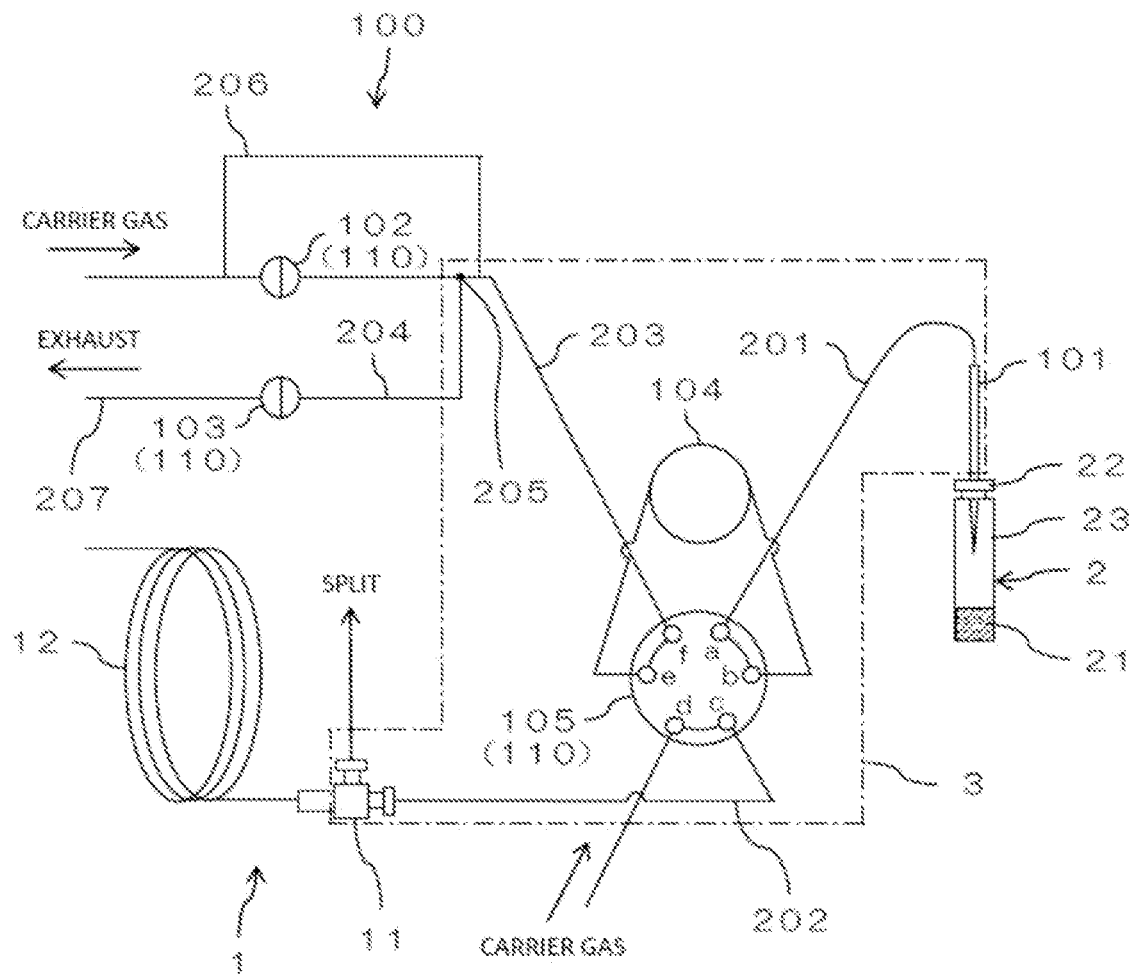
FIG. 1 is a channel diagram illustrating a sample introduction device of a first embodiment.

FIG. 1 is a channel diagram illustrating an embodiment of a sample introduction device 100. The sample introduction device 100 includes an insertion tube 101, an introduction valve 102, a discharge valve 103, a collection unit 104, a channel switching valve 105, and the like. A sample container 2 in which a sample is enclosed is set in the sample introduction device 100, and a sample (sample gas) vaporized in the sample container 2 is introduced into a gas chromatograph 1. Note that the gas chromatograph 1 is a concept including a gas chromatograph mass spectrometer.

The sample container 2 includes a vial 21 having an opening formed in an upper end portion, and a resin septum 22 that closes the opening of the vial 21. A sample is enclosed in the vial 21. The sample is, for example, a solid sample or a liquid sample. The insertion tube 101 is composed of, for example, a needle having a sharp tip, and a tip portion of the insertion tube 101 penetrates the septum 22 and is inserted into the inside of the vial 21. The insertion tube 101 communicates with the channel switching valve 105 via a pipe 201.

The sample container 2 is heated from the outside by a heating unit (not illustrated), and the sample in the sample container 2 is vaporized. The vaporized sample is stored in a space (head space 23) of an upper portion in the sample container 2. The insertion tube 101 is inserted into the sample container 2 so that the tip portion of the insertion tube 101 is located in the head space 23. Sample gas generated by the vaporization of the sample in the sample container 2 is derived from the insertion tube 101 inserted in the head space 23 and sent to the channel switching valve 105.

The collection unit 104 can communicate with the insertion tube 101 by operation of the channel switching valve 105. The collection unit 104 is composed of, for example, a sample loop, and collects and concentrates a component in the sample gas derived from the head space 23 of the sample container 2. When the collection unit 104 in which the sample component is concentrated is heated, the sample component in the collection unit 104 is volatilized and desorbed, and the sample component is supplied to the gas chromatograph 1 by carrier gas.

The channel switching valve 105 is composed of, for example, a six-way valve having six ports a to f. The insertion tube 101 communicates with the port a of the channel switching valve 105 via the pipe 201. Both end portions of the collection unit 104 communicate with the port b and the port e of the channel switching valve 105. The port c of the channel switching valve 105 communicates with the gas chromatograph 1 via a pipe 202. Carrier gas is supplied to the port d of the channel switching valve 105. This carrier gas is inert gas such as nitrogen gas or helium gas.

Carrier gas can be supplied to the port f of the channel switching valve 105 via a pipe (gas supply pipe) 203. This carrier gas is inert gas such as nitrogen gas or helium gas, and is supplied at a pressure different from that of the carrier gas supplied to the port d. The pressure of the carrier gas supplied to the ports d and f is applied by a pressure regulator (not illustrated). Further, the pipe 203 is branched to a pipe 204 at a branch portion 205. The pipe 203 and the pipe 204 can communicate with the insertion tube 101 by operation of the channel switching valve 105.

The introduction valve 102 is provided further on the upstream side than the branch portion 205 in the pipe 203. The introduction valve 102 is composed of, for example, an electromagnetic valve. When the introduction valve 102 is in an open state, carrier gas is supplied to the port f of the channel switching valve 105 via the pipe 203. The upstream side and the downstream side of the introduction valve 102 in the pipe 203 communicate with each other via a resistance pipe (additional channel) 206.

That is, the resistance pipe 206 branches from the pipe 203 on the upstream side of the introduction valve 102 and merges with the pipe 203 again on the downstream side of the introduction valve 102. The merging portion of the resistance pipe 206 with respect to the pipe 203 is further on the downstream side than the branch portion 205. In this manner, even when the introduction valve 102 is in a closed state, carrier gas can be supplied to the downstream side of the introduction valve 102 via the resistance pipe 206. The resistance pipe 206 is a pipe having an inner diameter smaller than that of the pipe 203 constituting a gas supply pipe.

The pipe 204 can communicate with a pipe (discharge pipe) 207 via the discharge valve 103. The discharge valve 103 is composed of, for example, an electromagnetic valve. When the discharge valve 103 is in an open state, gas can be discharged from the port f of the channel switching valve 105 to an exhaust port via the pipes 203, 204, and 207. In contrast, when the discharge valve 103 is in the closed state, flow of gas between the pipe 204 and the pipe 207 is cut off.

The gas chromatograph 1 includes a sample introduction unit 11 and a column 12. A sample component collected in the collection unit 104 is supplied to the gas chromatograph 1 via the pipe 202. Sample components supplied to the gas chromatograph 1 together with carrier gas are introduced into the column 12 from the sample introduction unit 11, and are separated for each sample component in a process of passing through the column 12. Each sample component separated as described above is detected by a detector (not illustrated), and a chromatogram is obtained as an analysis result.

Note that, in the present embodiment, a part of a sample supplied from the collection unit 104 to the sample introduction unit 11 is discharged to the outside together with carrier gas, so that the sample is introduced into the column 12 by what is called a split introduction method. However, the configuration is not limited to this configuration, and the configuration may be such that all samples supplied from the collection unit 104 to the sample introduction unit 11 are introduced into the column 12.

Each part, such as the insertion tube 101, the collection unit 104, the channel switching valve 105, or the sample introduction part 11, is arranged in a heating region 3 heated to a predetermined temperature. The heating region 3 is provided with a heating mechanism (not illustrated) for heating each part. The heating mechanism may be configured to include a heat transfer body such as an aluminum block and a heater. In this case, the configuration may be such that each of the parts is sandwiched between the heat transfer bodies, and heat from the heater is transferred to each part via the heat transfer body. However, the heating mechanism is not limited to the above configuration, and any other configuration can be employed.

The pipes 201 and 202 are arranged in the heating region 3. Apart further on the downstream side than the introduction valve 102 in the pipe 203 and a part further on the branch portion 205 side in the pipe 204 are also arranged in the heating region 3. In contrast, the introduction valve 102 and the discharge valve 103 are arranged outside the heating region 3 and are used in a state where they are not heated. The resistance pipe 206 that branches from the pipe 203 on the upstream side of the introduction valve 102 communicates with the pipe 203 in the heating region 3.

2. Operation of Sample Introduction Device

FIGS. 2A to 2D are channel diagrams for explaining operation of the sample introduction device 100. In FIGS. 2A to 2D, a channel through which gas flows is indicated by a broken line.

The sample introduction device 100 introduces a sample vaporized in the sample container 2 into the gas chromatograph 1 by switching the introduction valve 102, the discharge valve 103, and the channel switching valve 105. The introduction valve 102, the discharge valve 103, and the channel switching valve 105 constitute a switching mechanism 110 for switching a channel.

Figure 2A:
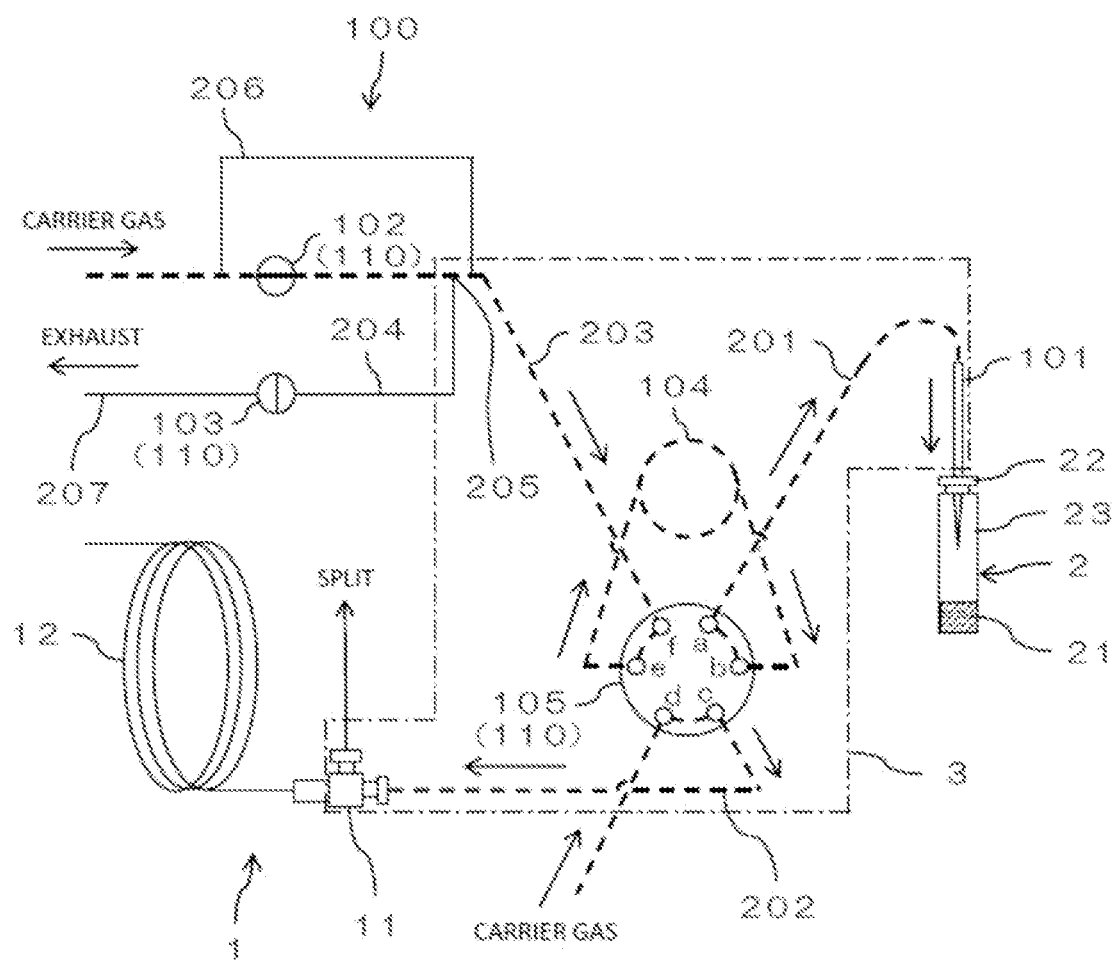
FIG. 2A is a channel diagram for explaining operation of the sample introduction device of the first embodiment.

In a state of FIG. 2A, the port a and the port b of the channel switching valve 105 communicate with each other, and the port e and the port f communicate with each other. Further, the introduction valve 102 is in an open state and the discharge valve 103 is in a closed state. Therefore, carrier gas supplied to the pipe 203 flows into the collection unit 104 through the ports f and e of the channel switching valve 105. Then, the carrier gas that has passed through the collection unit 104 is sent to the insertion tube 101 via the ports b and a of the channel switching valve 105 and the pipe 201.

Note that, in the state of FIG. 2A, the port c and the port d of the channel switching valve 105 communicate with each other. In this manner, carrier gas is supplied to the column 12 of the gas chromatograph 1 via the ports d and c of the channel switching valve 105 and the pipe 202.

If the tip portion of the insertion tube 101 is in a state of being inserted into the sample container 2 as illustrated in FIG. 2A, carrier gas supplied from the pipe 203 is supplied into the sample container 2 via the insertion tube 101. In this manner, the head space 23 is pressurized to a predetermined pressure. That is, the state of FIG. 2A is a pressurized state in which carrier gas is supplied from the pipe 203 to the insertion tube 101. In this pressurized state, the discharge valve 103 puts the insertion tube 101 and the pipe 207 into a non-communication state.

Figure 2B:
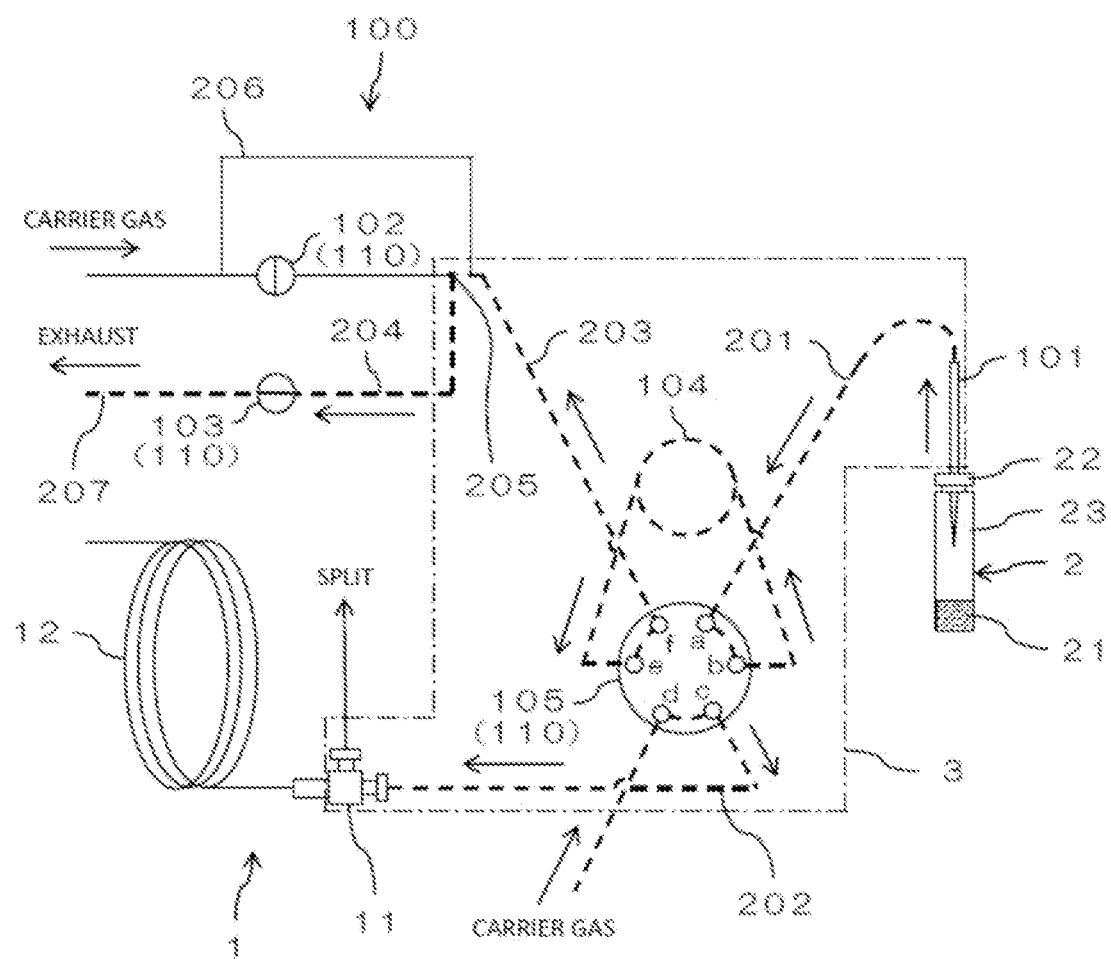
FIG. 2B is a channel diagram for explaining operation of the sample introduction device of the first embodiment.

When the introduction valve 102 is switched to a closed state and the discharge valve 103 is switched to an open state from the state of FIG. 2A, the state of FIG. 2B is obtained. In this manner, the pipe 207 constituting the discharge pipe is in a state of communicating with the insertion tube 101 via the collection unit 104. In this state of FIG. 2B, a sample vaporized in the sample container 2 is derived as sample gas from the head space 23 to the insertion tube 101 by pressure in the sample container 2.

Sample gas derived to the insertion tube 101 flows into the collection unit 104 through the pipe 201 and the ports a and b of the channel switching valve 105. Then, the sample gas that has passed through the collection unit 104 is discharged to the exhaust port via the ports e and f of the channel switching valve 105 and the pipes 203, 204, and 207. As described above, the state of FIG. 2B is a derivation state in which the pressurized sample gas in the head space 23 is derived from the insertion tube 101 to the pipe 207 via the collection portion 104. In this derivation state, the discharge valve 103 puts the insertion tube 101 and the pipe 207 in a communicating state. In the derivation state, a part of a component in the sample gas passing through the collection unit 104 is collected by the collection unit 104.

Immediately after the derivation state illustrated in FIG. 2B, the pressure in the head space 23 is high, and a flow rate of sample gas derived from the head space 23 is also high. However, the pressure in the head space 23 decreases with time elapses, and a flow rate of the sample gas passing through the pipes 201, 203, 204, and 207 also gradually decreases.

Figure 2C:
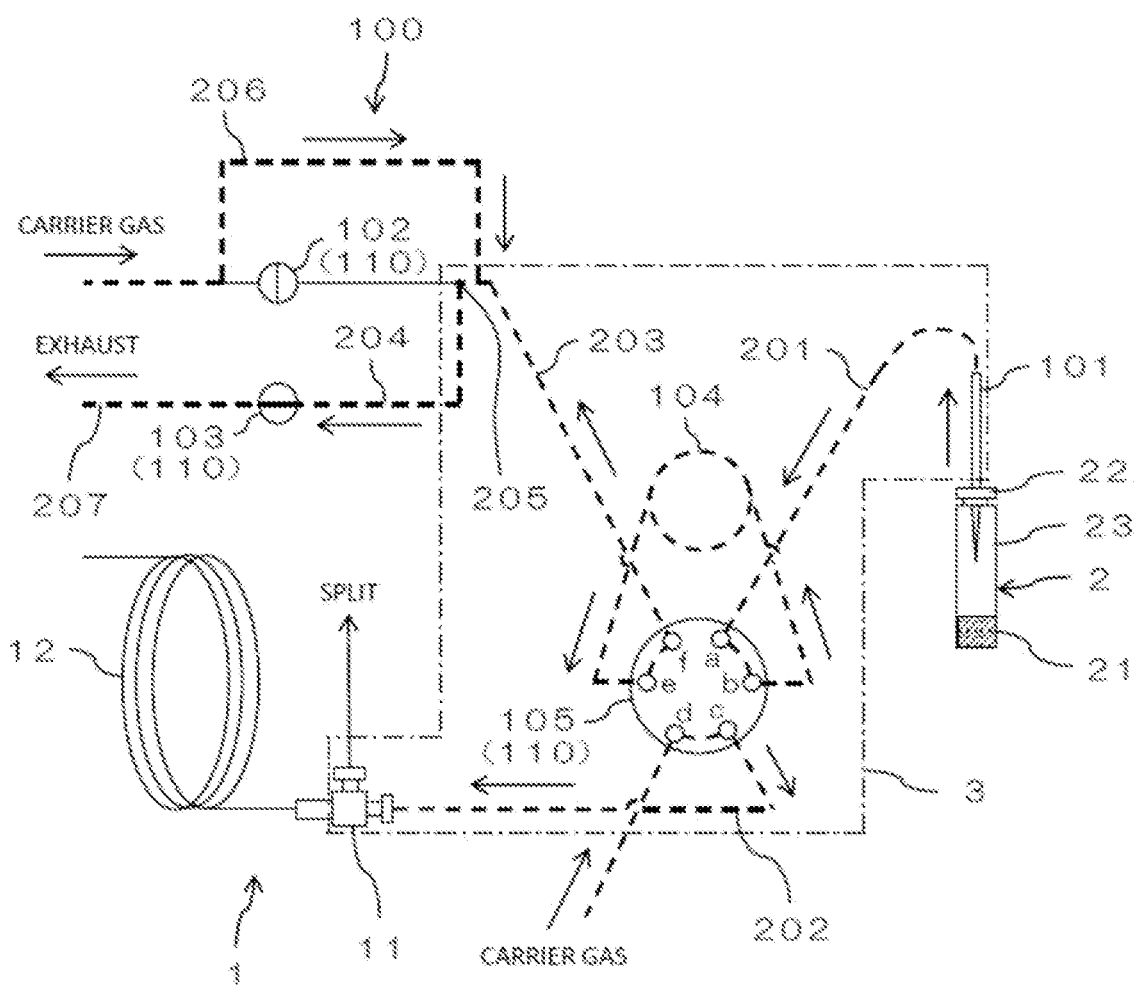
FIG. 2C is a channel diagram for explaining operation of the sample introduction device of the first embodiment.

When the pressure of the sample gas in the pipe 203 becomes smaller than the pressure of the carrier gas in the resistance pipe 206, carrier gas in the resistance pipe 206 flows into the pipe 203 and passes via the pipes 204 and 207 together with the sample gas as illustrated in FIG. 2C. That is, in the derivation state, gas is supplied from the resistance pipe 206 to the pipe 203 between the collection unit 104 and the discharge valve 103. In this manner, lowering in pressure of gas in the pipes 204 and 207 and the discharge valve 103 is suppressed.

Figure 2D:
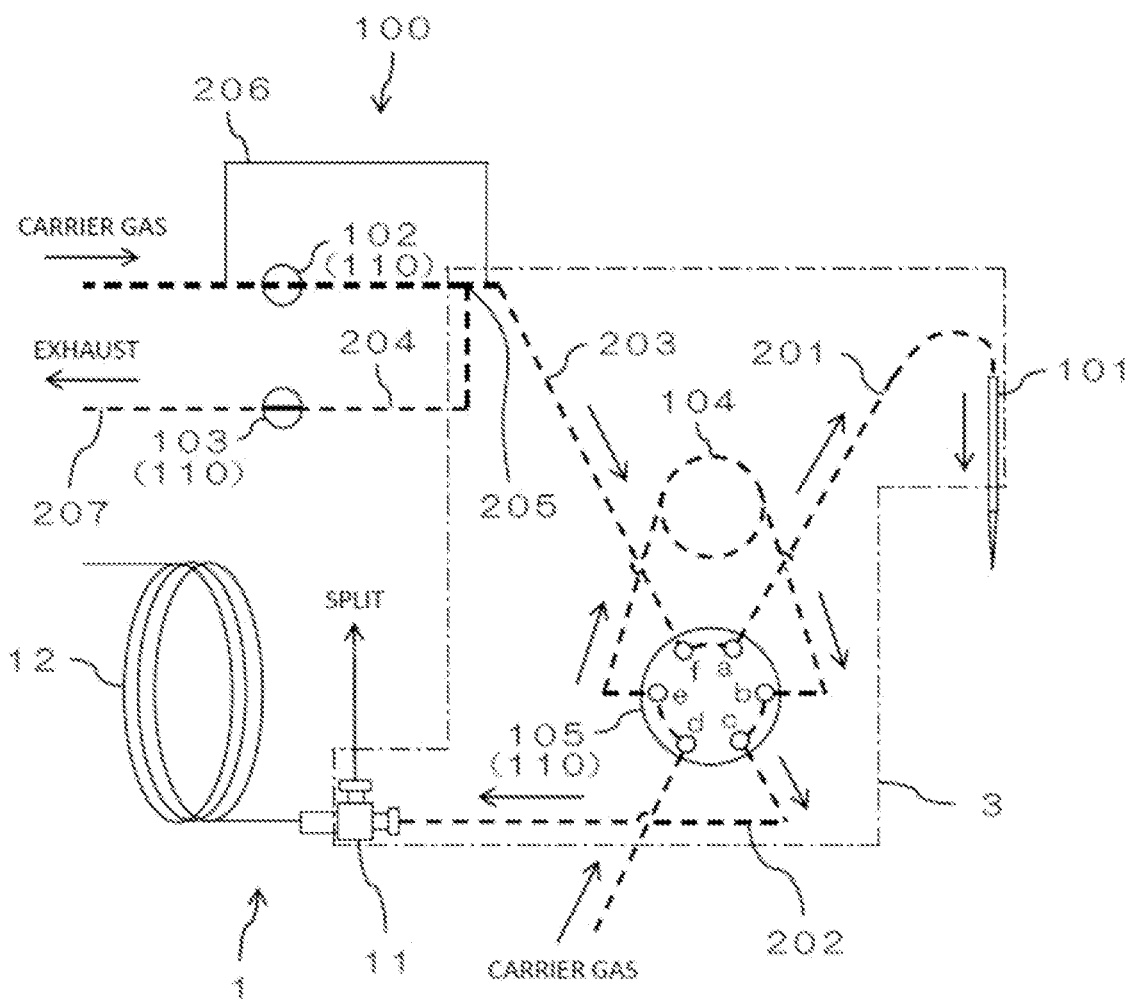
FIG. 2D is a channel diagram for explaining operation of the sample introduction device of the first embodiment.

After that, as illustrated in FIG. 2D, the introduction valve 102 is put in an open state and the channel switching valve 105 is switched. In a state of FIG. 2D, the port b and the port c of the channel switching valve 105 communicate with each other, and the port d and the port e communicate with each other. Note that the discharge valve 103 is maintained in the open state.

In this manner, carrier gas flows into the collection unit 104 via the port d and the port e of the channel switching valve 105. Then, carrier gas that has passed through the collection unit 104 is supplied to the gas chromatograph 1 via the ports b and c of the channel switching valve 105 and the pipe 202. At this time, a component collected in the collection unit 104 is supplied to the gas chromatograph 1 together with the carrier gas, and each component is separated in a process of passing through the column 12.

Note that, in a supply state illustrated in FIG. 2D, the port a and the port f of the channel switching valve 105 communicate with each other. In this manner, carrier gas supplied to the pipe 203 is supplied to the insertion tube 101 via the ports f and a of the channel switching valve 105 and the pipe 201.

The operation of FIGS. 2A to 2D as described above may be performed in a state where the sample is contained in the sample container 2 and a state in which the sample is not contained in the sample container 2. In this case, sample analysis is performed in a state where the sample is contained in the sample container 2, and blank analysis is performed in a state where the sample is not contained in the sample container 2. The concentration of each component in the sample can be calculated based on an analysis result obtained by the gas chromatograph 1 in the sample analysis and an analysis result obtained by the gas chromatograph 1 in the blank analysis.

3. Remaining of Sample Component

Figure 3A:
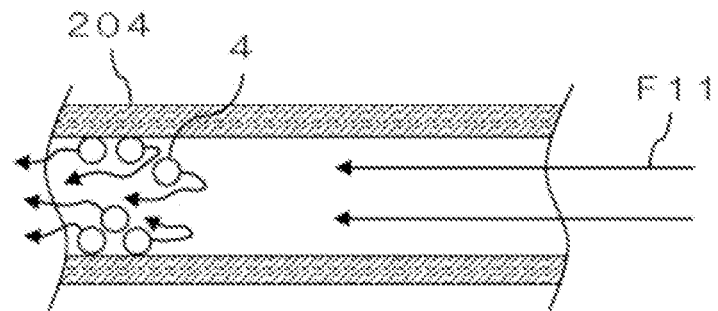
FIG. 3A is a schematic cross-sectional view for explaining remaining of a sample component in a pipe of the first embodiment.
Figure 3B:
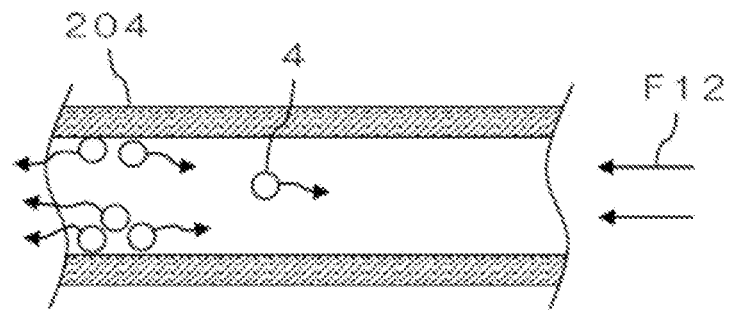
FIG. 3B is a schematic cross-sectional view for explaining remaining of a sample component in the pipe of the first embodiment.
Figure 3C:
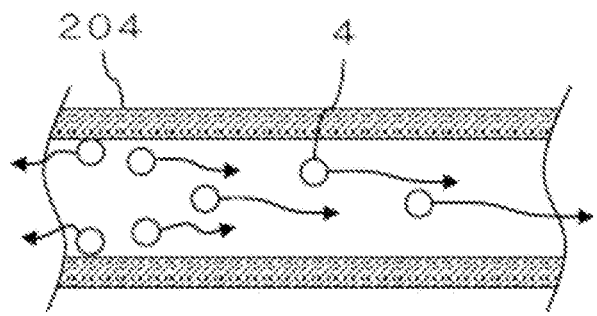
FIG. 3C is a schematic cross-sectional view for explaining remaining of a sample component in the pipe of the first embodiment.

FIGS. 3A to 3C are schematic cross-sectional views for explaining remaining of a sample component in the pipe 204. As illustrated in FIG. 3A, a part of a component (molecule) 4 in sample gas that has passed through the collection unit 104 may be adsorbed and remain on an inner wall surface of the pipe 204.

When the pressure in the head space 23 is high and a flow rate of sample gas derived from the head space 23 is high, the sample gas passes through the pipe 204 at a high flow rate as indicated by an arrow F11 in FIG. 3A. For this reason, even in a case where the component 4 is adsorbed on an inner wall surface of the pipe 204, the component 4 is unlikely to diffuse on the upstream side with respect to the sample gas.

However, when the pressure in the head space 23 is lowered as time elapses and a flow rate of sample gas passing through the pipe 204 decreases, a flow velocity of the sample gas passing through the pipe 204 decreases as indicated by an arrow F12 in FIG. 3B. At this time, the component 4 adsorbed on an inner wall surface of the pipe 204 may diffuse to the upstream side with respect to the sample gas, as illustrated in FIG. 3B.

Then, immediately before the end of the derivation of the sample gas from the head space 23, the flow velocity of the sample gas becomes very low, and many of the components 4 may diffuse to the upstream side with respect to the sample gas as illustrated in FIG. 3C. In this case, a component remaining in the pipe 204 may diffuse to the collection unit 104.

Figure 4A:
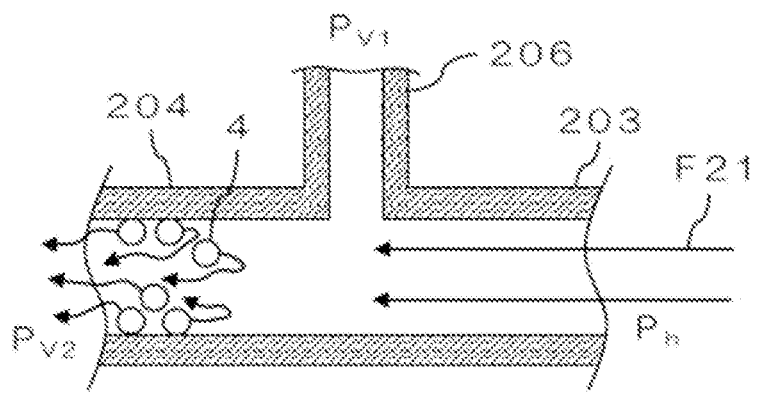
FIG. 4A is a schematic cross-sectional view for explaining flow of gas around a pipe in the first embodiment.
Figure 4B:
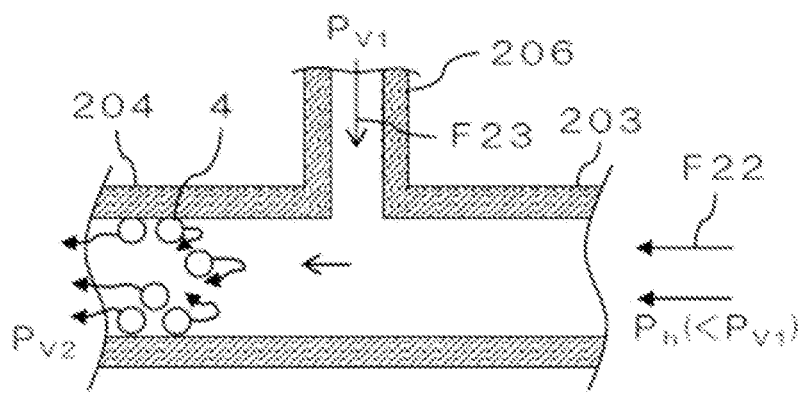
FIG. 4B is a schematic cross-sectional view for explaining flow of gas around the pipe in the first embodiment.
Figure 4C:
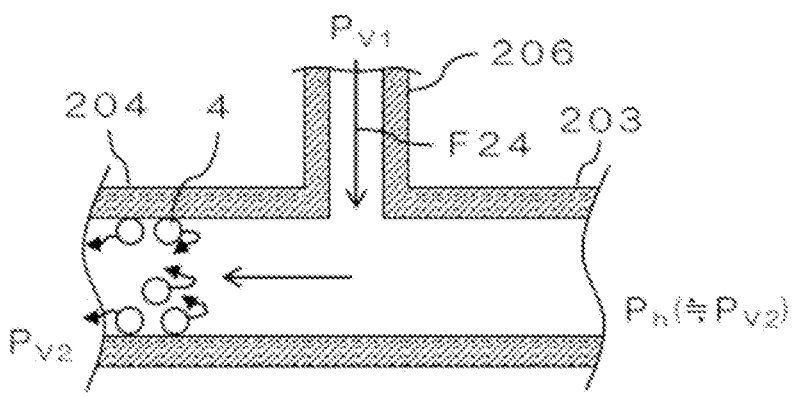
FIG. 4C is a schematic cross-sectional view for explaining flow of gas around the pipe in the first embodiment.

FIGS. 4A to 4C are schematic cross-sectional views for explaining flow of gas around the pipe 204 in the present embodiment. As illustrated in FIG. 4A, a part of the component (molecule) 4 in sample gas that has passed through the collection unit 104 may be adsorbed and remain on an inner wall surface of the pipe 204. In particular, the component 4 in the sample gas is likely to be adsorbed in a portion arranged outside the heating region 3 in the pipe 204.

In the present embodiment, as illustrated in FIG. 4A, the resistance pipe 206 communicates with the pipe 203 further on the collection unit 104 side than the pipe 204. Pressure of the carrier gas in the resistance pipe 206 is $P_{V1}$. In contrast, pressure in the pipe 204 is at $P_{V2}$, which is slightly lower than $P_{V1}$, by a pressure regulator (not illustrated). However, the pressure $P_{V2}$ may be atmospheric pressure. These pressures $P_{V1}$ and $P_{V2}$ are lower than pressure (predetermined pressure) in the head space 23 when pressurized. That is, the resistance pipe 206 supplies gas to a channel (the pipe 203) between the collection unit 104 and the discharge valve 103 at pressure lower than the predetermined pressure and higher than the pressure inside the pipe 204.

Pressure $P_h$ in the pipe 203 is the above predetermined pressure immediately after the derivation of sample gas from the head space 23 is started. In this manner, when the pressure in the head space 23 is high and a flow rate of sample gas derived from the head space 23 is high, the sample gas passes through the pipe 204 at a high flow rate as indicated by an arrow F21 in FIG. 4A. For this reason, even in a case where the component 4 is adsorbed on an inner wall surface of the pipe 204, the component 4 is unlikely to diffuse on the upstream side with respect to the sample gas. Note that, in a state of FIG. 4A, since the pressure $P_h$ in the pipe 203 is higher than the pressure $P_{V1}$ in the resistance pipe 206, carrier gas does not flow into the pipe 203 from the resistance pipe 206.

After the above, when the pressure in the head space 23 is lowered as time elapses and the pressure $P_h$ in the pipe 203 becomes lower than the pressure $P_{V1}$ in the resistance pipe 206, a flow rate of the sample gas flowing into the pipe 204 decreases, and the flow velocity of the sample gas flowing into the pipe 204 decreases as indicated by an arrow F22 in 4B. At this time, as indicated by an arrow F23 in FIG. 4B, carrier gas flows from the resistance pipe 206 into the pipe 203. In this manner, it is possible to prevent the component 4 adsorbed on the inner wall surface of the pipe 204 from diffusing to the upstream side with respect to the sample gas.

Immediately before the end of the derivation of the sample gas from the head space 23, the flow velocity of the sample gas becomes extremely low. However, as indicated by an arrow F24 in FIG. 4C, carrier gas continuously flow from the resistance pipe 206 into the pipe 203. Therefore, it is possible to prevent the component 4 in the pipe 204 from diffusing to the collection unit 104.

In FIGS. 3A to 3C and FIGS. 4A to 4C, the case where the component 4 in the sample gas is adsorbed on the inner wall surface of the pipe 204 is described. However, the component 4 in the sample gas may be adsorbed on an inner wall surface of a pipe other than the pipe 204. Further, the component 4 in the sample gas may be adsorbed on an inner wall surface of the discharge valve 103 or the like. Since the discharge valve 103 is also arranged outside the heating region 3, the component 4 in the sample gas is easily adsorbed.

4. Second Embodiment

A second embodiment is the same as the first embodiment except that a part of the configuration of the sample introduction device 100 is changed so that the presence or absence of gas leakage can be detected. Therefore, description overlapping with the first embodiment will be omitted.

Figure 5:
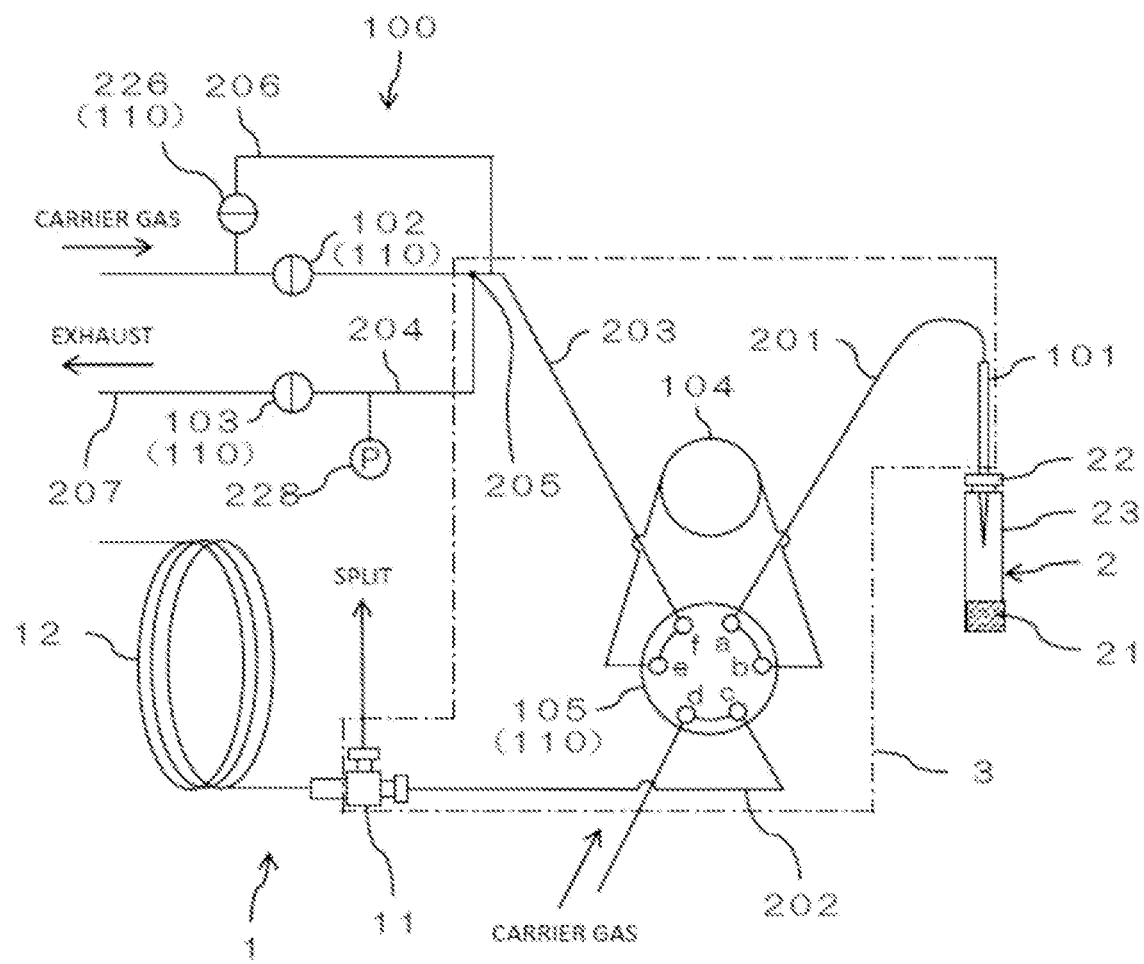
FIG. 5 is a channel diagram illustrating the sample introduction device of a second embodiment.

FIG. 5 is a channel diagram illustrating the second embodiment of the sample introduction device 100. In the sample introduction device 100 illustrated in FIG. 5, an additional valve 226 and a pressure sensor 228 are newly provided.

The additional valve 226 is a valve for allowing the resistance pipe 206 to be opened and closed. Further, in the second embodiment, the switching mechanism 110 includes the additional valve 226.

In the second embodiment, a valve in an open state is switched to a closed state after a pressurized state, and flow of gas through the introduction valve 102, the additional valve 226, and the discharge valve 103 is cut off. That is, in the second embodiment, pressure in a pressurized channel is maintained after the pressurized state.

Further, in the second embodiment, the pressure sensor 228 is provided at an optional position in a channel that is pressurized as carrier gas is supplied to the pipe 203. The pressure sensor 228 is a sensor for measuring pressure in the channel that is pressurized as the carrier gas is supplied to the pipe 203. In the example illustrated in FIG. 5, the pressure sensor 228 is provided in the pipe 204. Note that the position where the pressure sensor 228 is provided is preferably outside the heating region 3.

Figure 6:
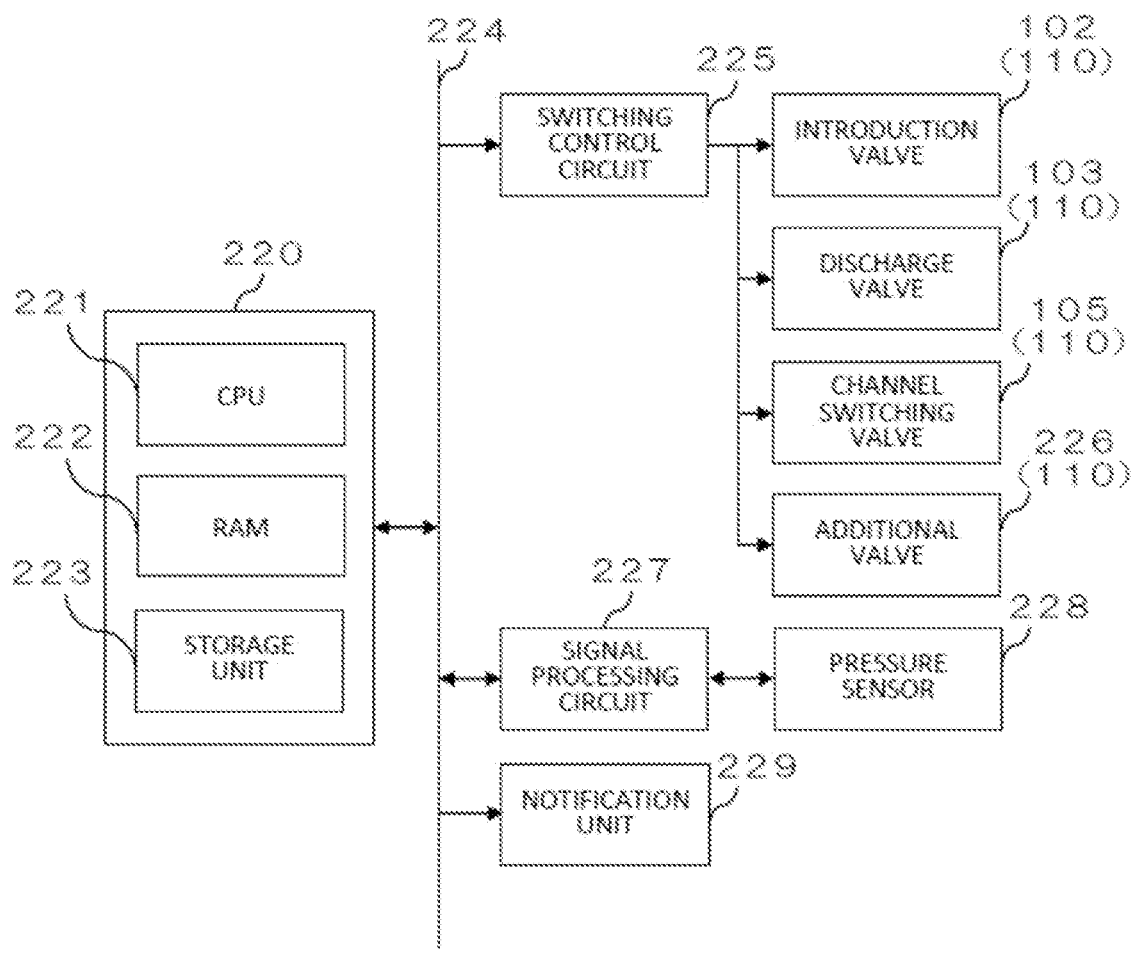
FIG. 6 is a block diagram illustrating an electrical configuration of the sample introduction device of the second embodiment.

FIG. 6 is a block diagram illustrating an example of an electrical configuration of the sample introduction device 100 according to the second embodiment. As illustrated in FIG. 6, the sample introduction device 100 further includes a control device 220, a switching control circuit 225, a signal processing circuit 227, and a notification unit 229.

The control device 220 is electrically connected to each of the switching control circuit 225, the signal processing circuit 227, and the notification unit 229 via a circuit 224 such as a bus.

Further, the switching control circuit 225 is electrically connected to the introduction valve 102, the discharge valve 103, the channel switching valve 105, and the additional valve 226. The pressure sensor 228 is electrically connected to the signal processing circuit 227.

The control device 220 is responsible for overall control of the sample introduction device 100. The control device 220 includes a central processing unit (CPU) 221. Further, the control device 220 includes a random access memory (RAM) 222 and a storage unit 223 that the CPU 221 can directly access.

The CPU 221 controls each component of the sample introduction device 100. The RAM 222 is used as a work area and a buffer area of the CPU221. The storage unit 223 is a non-volatile memory, and, for example, a hard disc drive (HDD), a solid state drive (SSD), or the like is used as the storage unit 223.

The storage unit 223 stores a control program for controlling each component of the sample introduction device 100 and data (execution data) required for executing the control program. Note that the storage unit 223 may be configured to include the RAM 222.

The switching control circuit 225 generates a voltage (driving voltage) for driving each of the valves 102, 103, 105, and 226, and appropriately applies the voltage to the introduction valve 102 and the like. Note that, in the second embodiment, each of the valves 102, 103, 105, and 226 is a solenoid valve (electromagnetic valve). In the second embodiment, the control device 220 controls operation of the switching mechanism 110, specifically, operation of each of the valves 102, 103, 105, and 226.

The signal processing circuit 227 is a circuit for processing a signal output from the pressure sensor 228, and the signal processing circuit 227 includes, for example, an amplifier circuit for amplifying a signal output from the pressure sensor 228.

The notification unit 229 includes a configuration for notifying that gas is leaking. In the second embodiment, the notification unit 229 includes a display unit and a control circuit for displaying various screens on the display unit. The display unit here refers to a general-purpose display.

Note that the method of notification is not particularly limited as long as the gas leak can be notified visually, audibly, or tactilely. For example, the notification unit 229 may be configured to include a D/A conversion circuit, an amplifier circuit for amplifying an analog audio signal converted by the D/A conversion circuit, a general-purpose speaker, and the like. Alternatively, the notification unit 229 may be configured to include a light emitting unit and a circuit for controlling lighting of the light emitting unit. Further, the notification unit 229 may be configured to include a vibrating unit and a circuit for controlling the vibrating unit.

In the second embodiment, the detection of the presence or absence of gas leakage is performed during a series of operations (introduction operation) for introducing the sample from the sample introduction unit 11 to the column 12 described with reference to FIGS. 2A to 2D.

The introduction operation of the second embodiment includes operation for switching the sample introduction device 100 in the pressurized state to a state for maintaining pressure in a pressurized channel (pressurization maintenance state). Hereinafter, the introduction operation of the second embodiment will be described with reference to FIGS. 7A to 7E. Each of FIGS. 7A to 7E is a channel diagram for explaining operation of the sample introduction device 100 of the second embodiment.

In the second embodiment, the introduction operation is appropriately started. For example, if the sample introduction device 100 includes an operation receiving unit that receives operation from the user, the introduction operation is started in response to the operation from the user. Further, in a case where the sample introduction device 100 includes a communication unit for communicating with another device, the introduction operation may be started in response to operation of an operation unit included in the another device. As an example, in a case where the gas chromatograph 1 includes an operation unit and the gas chromatograph 1 and the sample introduction device 100 can communicate with each other, the introduction operation is started according to operation of the operation unit included in the gas chromatograph 1.

Figure 7A:
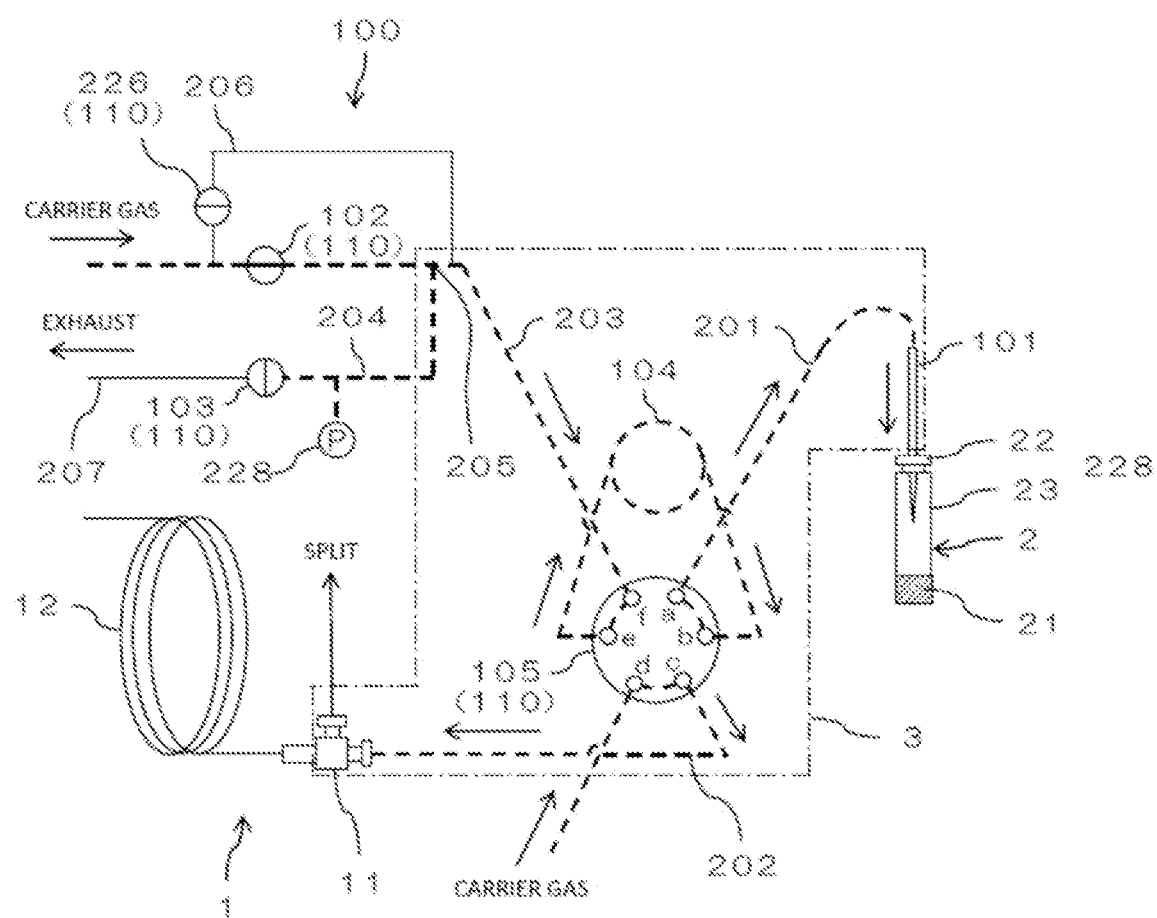
FIG. 7A is a channel diagram for explaining operation of the sample introduction device of the second embodiment.

In the second embodiment, when the introduction operation is started, the sample introduction device 100 in a default state is switched to the pressurized state illustrated in FIG. 7A. Note that, in the sample introduction device 100 in the pressurized state of the second embodiment, at least the introduction valve 102 between the introduction valve 102 and the additional valve 226 is set in an open state.

In the second embodiment, a switching condition for switching the sample introduction device 100 in the pressurized state to the pressurization maintenance state is defined. That is, when the switching condition is satisfied, the sample introduction device 100 in the pressurized state illustrated in FIG. 7A is switched to the pressurization maintenance state illustrated in FIG. 7B.

The switching condition is satisfied based on a pressure value in a pressurized channel. Specifically, the switching condition is satisfied when the pressure value in the pressurized channel becomes equal to or more than a predetermined threshold. Further, the switching condition may be determined based on an element (estimation element) by which the pressure value in the pressurized channel can be estimated.

A supply amount of carrier gas can be estimated from elapsed time from start of the supply of the carrier gas to the pipe 203, and the pressure value in the pressurized channel can be estimated from the supply amount of the carrier gas. Therefore, when the sample introduction device 100 in the pressurized state is switched to the pressurization maintenance state, the estimation element includes the elapsed time from the start of the supply of the carrier gas to the pipe 203. For example, the switching condition is satisfied when the elapsed time from the start of the supply of the carrier gas to the pipe 203 exceeds a threshold.

Further, the switching condition may be satisfied based on a change amount in the pressure value in the pressurized channel within a predetermined time. For example, when a change amount in the pressure value in the pressurized channel within the predetermined time exceeds a threshold, the switching condition is satisfied.

When the sample introduction device 100 in the pressurized state is switched to the pressurization maintenance state, a valve in an open state is switched to a closed state in the pressurized state. Note that a state of the channel switching valve 105 in the pressurization maintenance state is the same as a state in the pressurized state. From these facts, when the sample introduction device 100 in the pressurized state is switched to the pressurization maintenance state, the resistance pipe 206 is set to a closed state by the additional valve 226 in a state where supply of gas from the gas supply pipe 203 to the insertion tube 101 is stopped.

In the second embodiment, when the sample introduction device 100 in the pressurized state is switched to the pressurization maintenance state, the presence or absence of gas leakage is detected.

In the second embodiment, a gas leakage condition for detecting gas leakage is defined. That is, when the gas leakage condition is satisfied, gas leakage is detected. In contrast, if the gas leakage condition is not satisfied, gas leakage is not detected.

The gas leakage condition is satisfied based on the pressure value in the pressurized channel, similar to the switching condition. In the second embodiment, the gas leakage condition is satisfied when the pressure value in the pressurized channel becomes less than a predetermined threshold.

Furthermore, the gas leakage condition may be satisfied based on the pressure value in the pressurized channel within a predetermined time. For example, when a change amount in the pressure value in the pressurized channel within the predetermined time exceeds a threshold, the gas leakage condition is satisfied.

When the gas leakage condition is satisfied and gas leakage from the pressurized channel is detected, the notification unit 229 notifies that gas is leaking. In the second embodiment, since the notification unit 229 includes the display unit and the like, the fact that gas is leaking is displayed on the display unit as a message.

Note that, for example, if the notification unit 229 includes the speaker as described above, the speaker may emit a voice message indicating that gas is leaking. Alternatively, if the notification unit 229 includes a vibrating unit, the vibrating unit may be controlled to vibrate. Further, if the notification unit 229 includes a light emitting unit, the light emitting unit may be controlled to emit light.

Furthermore, when gas leakage is notified, the sample introduction device 100 in the pressurization maintenance state may be switched to a default state. Furthermore, when the sample introduction device 100 is switched to the default state, that the introduction of the sample is stopped may be notified.

Figure 7B:
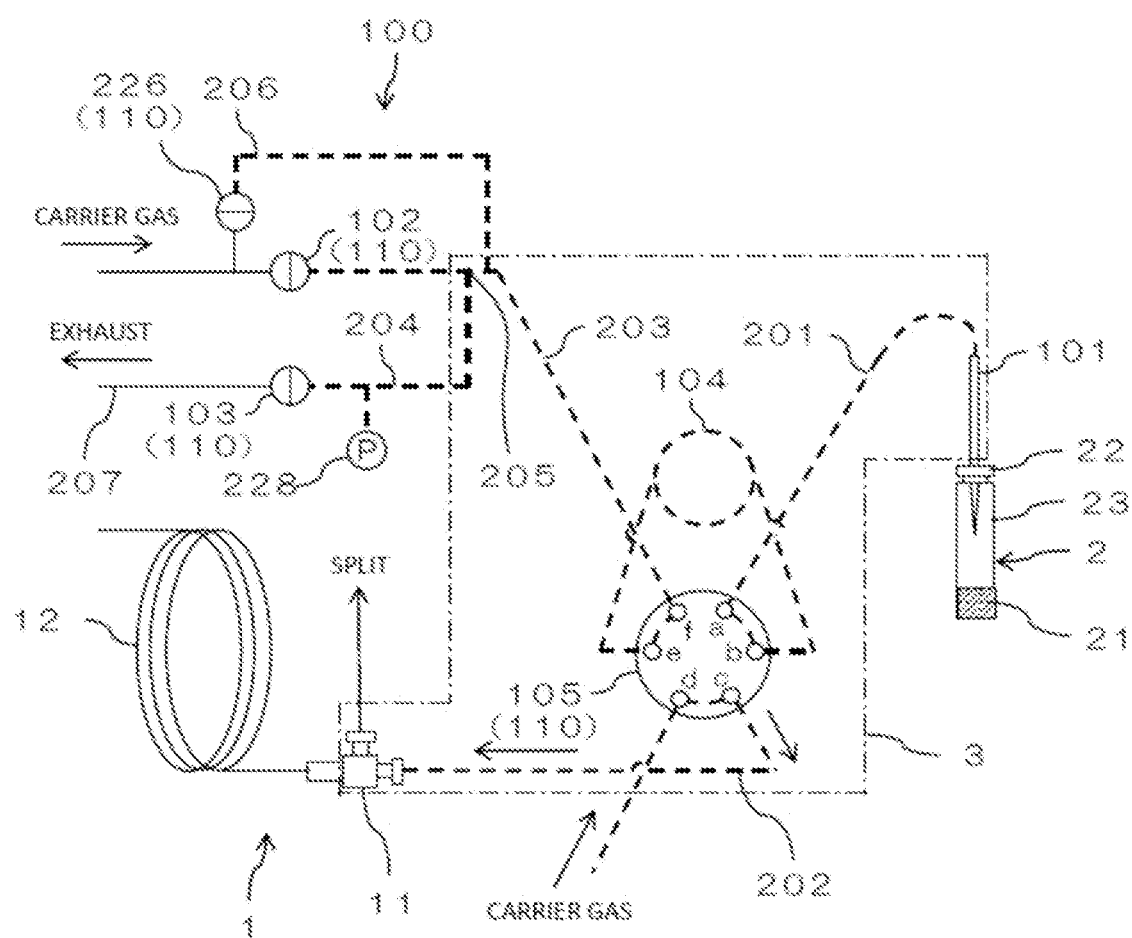
FIG. 7B is a channel diagram for explaining operation of the sample introduction device of the second embodiment.
Figure 7C:
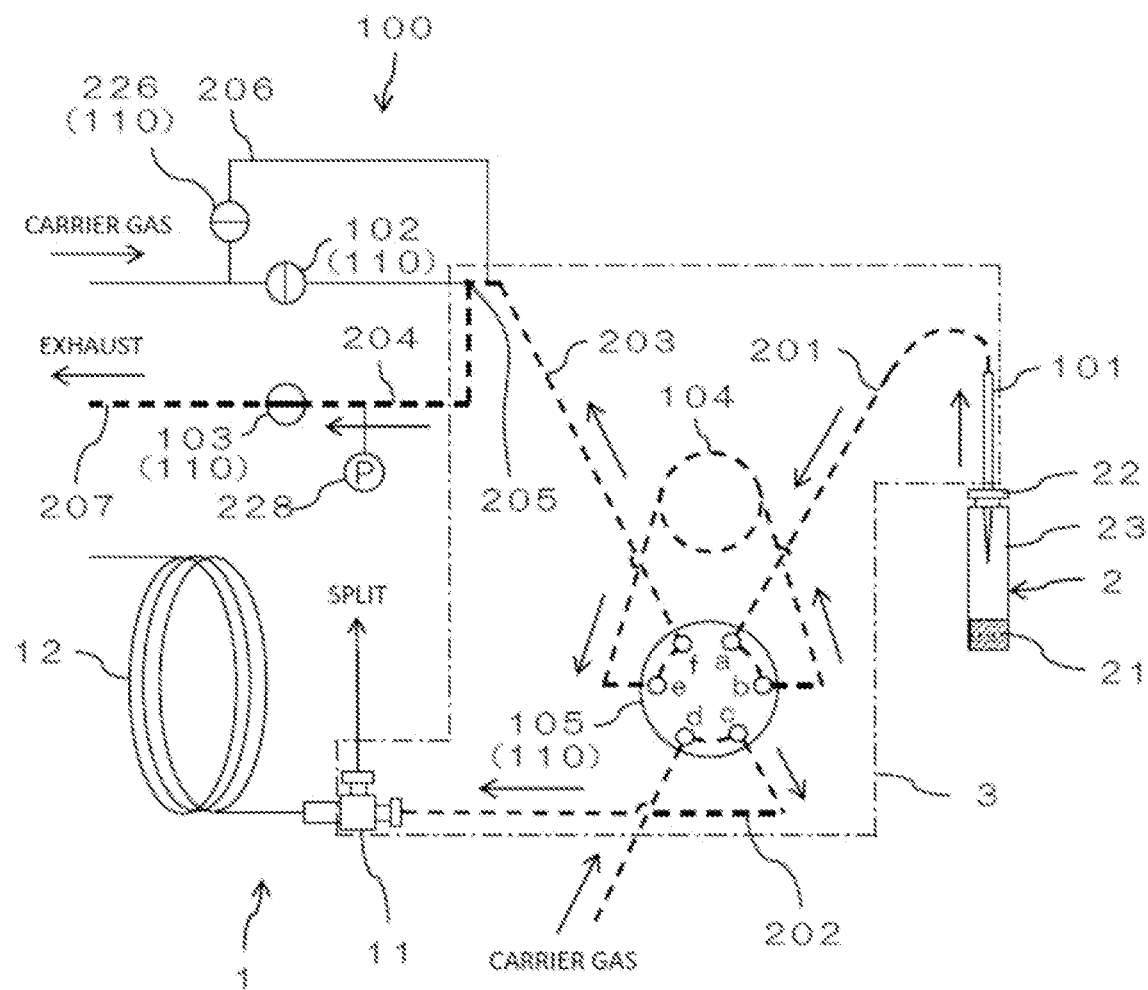
FIG. 7C is a channel diagram for explaining operation of the sample introduction device of the second embodiment.
Figure 7D:
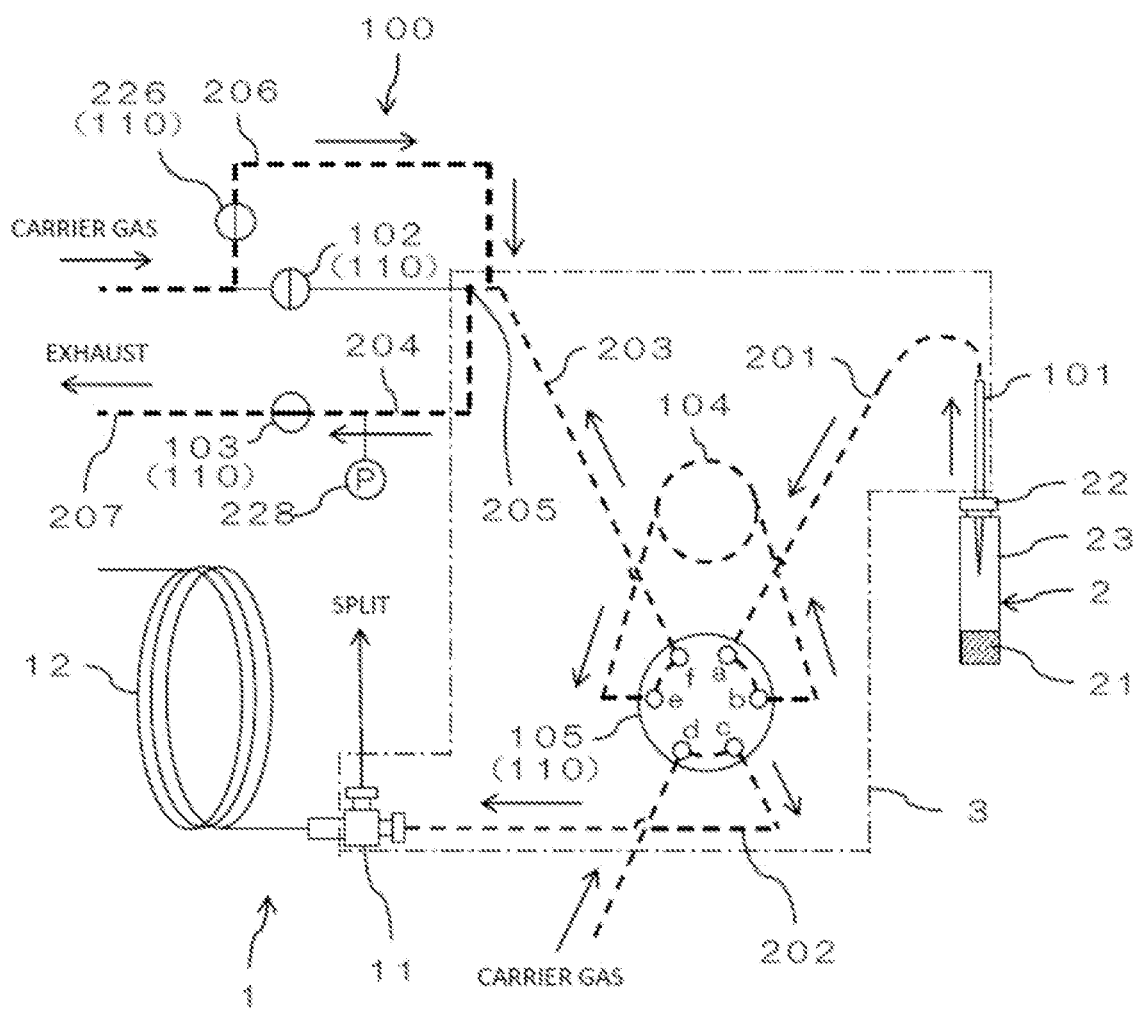
FIG. 7D is a channel diagram for explaining operation of the sample introduction device of the second embodiment.
Figure 7E:
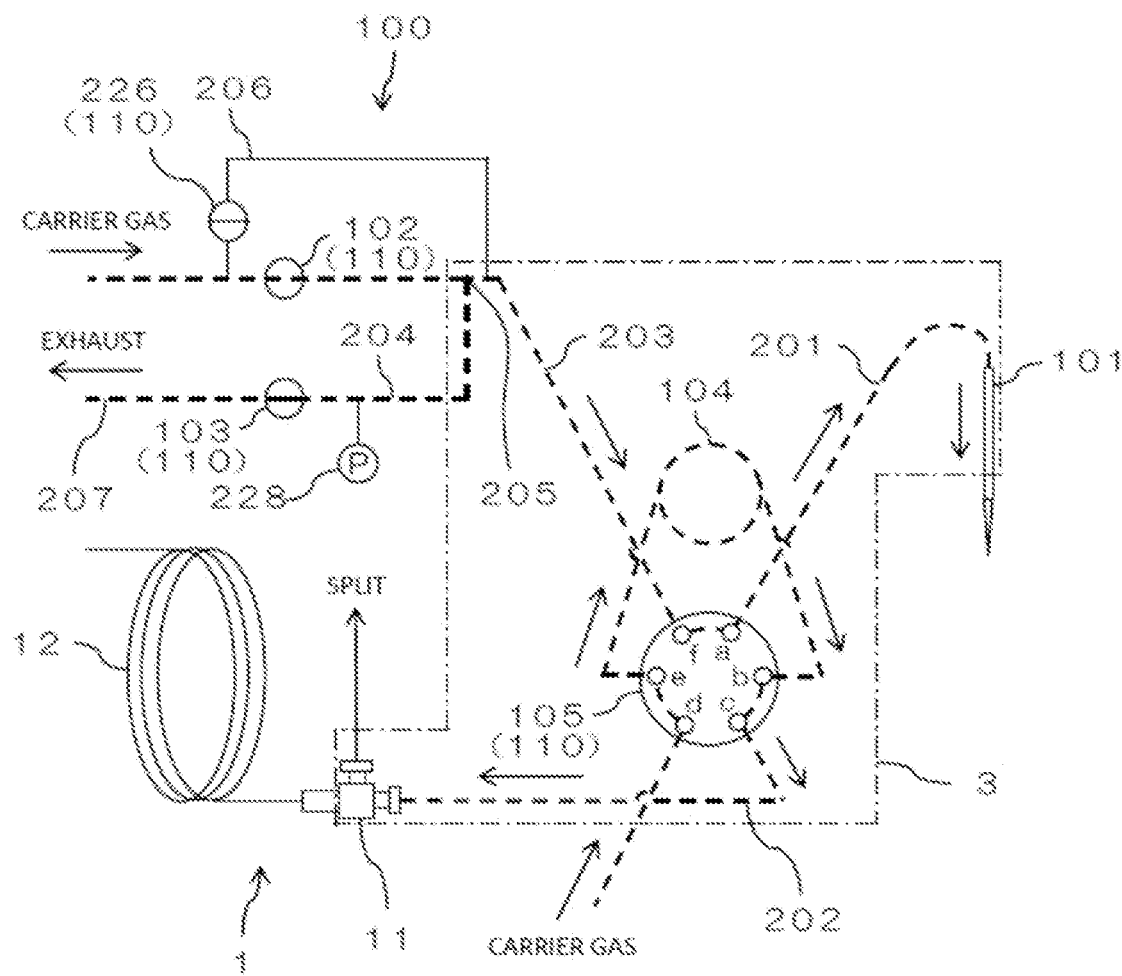
FIG. 7E is a channel diagram for explaining operation of the sample introduction device of the second embodiment.

In a case where no gas leakage is detected, the sample introduction device 100 is sequentially switched to the derivation state illustrated in FIG. 7C, the derivation state illustrated in FIG. 7D, and the supply state illustrated in FIG. 7E. Further, in the derivation state illustrated in FIG. 7C, the additional valve 226 is in the closed state. Furthermore, in the derivation state illustrated in FIG. 7D, the additional valve 226 is in the open state. Moreover, in the supply state illustrated in FIG. 7E, the additional valve 226 is in the closed state.

Figure 8:
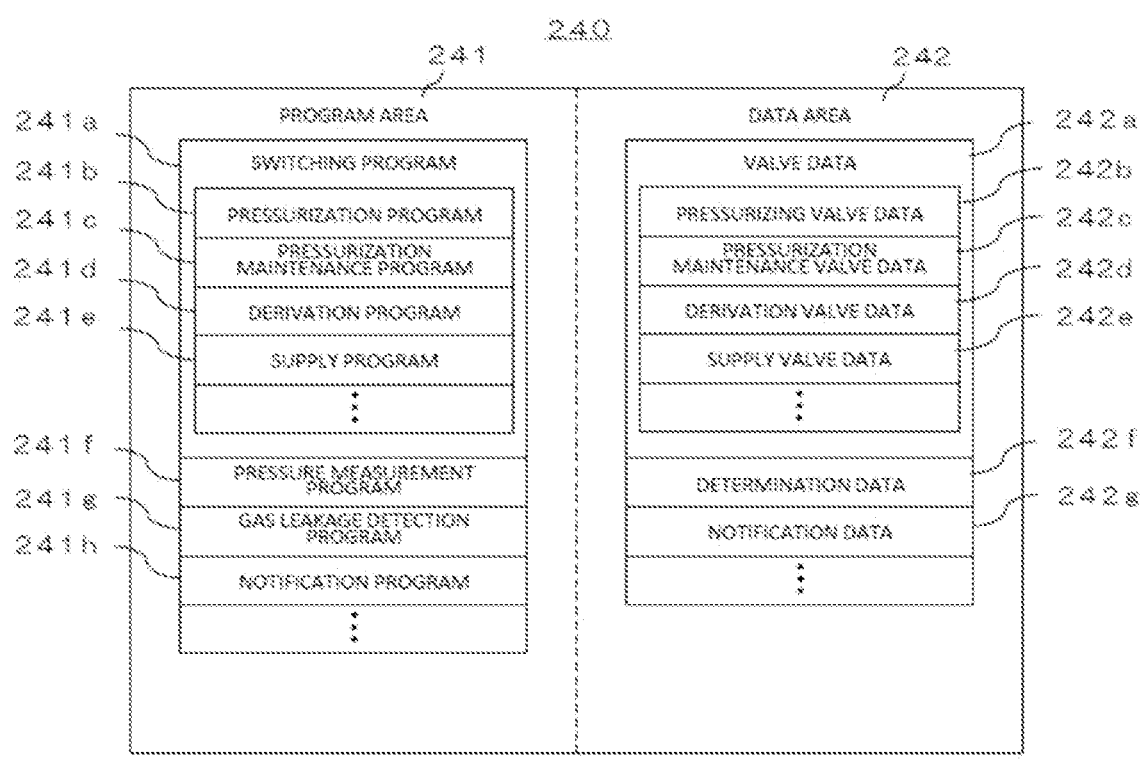
FIG. 8 is a diagram illustrating an example of a memory map of a RAM of the sample introduction device of the second embodiment.

FIG. 8 is a diagram showing an example of a memory map of the RAM 222 of the sample introduction device 100 of the second embodiment. As illustrated in FIG. 8, the RAM 222 includes a program area 241 and a data area 242, and the program area 241 stores a control program read in advance from the storage unit 223.

The control program includes a switching program 241*a*, a pressure measurement program 241*f*, a gas leakage detection program 241*g*, a notification program 241*h*, and the like.

Further, the switching program 241*a* includes a pressurization program 241*b*, a pressurization maintenance program 241*c*, a derivation program 241*d*, an introduction/supply program 241*e*, and the like.

In the data area 242, execution data read from the storage unit 223 in advance is stored, or data corresponding to a signal output from the pressure sensor 228 is temporarily stored. Furthermore, the data area 242 is provided with a timer (counter) and a register necessary for executing the control program.

In the example illustrated in FIG. 8, valve data 242*a*, determination data 242*f* and notification data 242*g* are stored in the data area 242.

Further, the valve data 242*a* includes pressurizing valve data 242*b*, pressurization maintenance valve data 242*c*, derivation valve data 242*d*, and supply valve data 242*e*.

The valve data 242*a* is data indicating states of the valves 102, 103, 105, and 226. The pressurizing valve data 242*b* is data indicating states of the valves 102, 103, 105, and 226 in the sample introduction device 100 in the pressurized state illustrated in FIG. 7A. The pressurizing valve data 242*b* indicates, for example, an open state of the introduction valve 102, a closed state of the discharge valve 103, and a closed state of the additional valve 226.

Further, the pressurizing valve data 242*b* indicates that the port a and the port b in the channel switching valve 105 communicate with each other, the port c and the port d communicate with each other, and the port e and the port f communicate with each other. This also applies to the pressurization maintenance valve data 242*c* and the derivation valve data 242*d*.

The pressurization maintenance valve data 242*c* is data indicating states of the valves 102, 103, 105, and 226 in the sample introduction device 100 in the pressurization maintenance state illustrated in FIG. 7B. The pressurization maintenance valve data 242*c* indicates the closed state of the introduction valve 102, the discharge valve 103, and the additional valve 226 in addition to a state of the channel switching valve 105.

The derivation valve data 242*d* is data indicating states of the valves 102, 103, 105, and 226 in the sample introduction device 100 in the derivation state. The derivation valve data 242*d* includes first derivation valve data and second derivation valve data.

The first derivation valve data is data indicating states of the valves 102, 103, 105, and 226 in the sample introduction device 100 in the derivation state illustrated in FIG. 7C, and the first derivation valve data indicates a closed state of the introduction valve 102, an open state of the discharge valve 103, and a closed state of the additional valve 226 in addition to a state of the channel switching valve 105.

The second derivation valve data is data indicating states of the valves 102, 103, 105, and 226 in the sample introduction device 100 in the derivation state illustrated in FIG. 7D, and the second derivation valve data indicates a closed state of the introduction valve 102, an open state of the discharge valve 103, and an open state of the additional valve 226 in addition to a state of the channel switching valve 105.

The supply valve data 242*e* is data indicating states of the valves 102, 103, 105, and 226 in the sample introduction device 100 in the supply state illustrated in FIG. 7E. The supply valve data 242*e* indicates, for example, an open state of the introduction valve 102, an open state of the discharge valve 103, and a closed state of the additional valve 226.

Further, the introduction valve data 242*e* indicates that the port a and the port f in the channel switching valve 105 communicate with each other, the port b and the port c communicate with each other, and the port d and the port e communicate with each other.

The determination data 242*f* is data for determining whether or not various conditions are satisfied. The determination data 242*f* includes pressure value data and threshold data.

The pressure value data is data indicating a pressure value calculated by using the pressure sensor 228 or the like. The threshold data includes data indicating a threshold for determining whether or not the switching condition is satisfied and data indicating a threshold for determining whether or not the gas leakage condition is satisfied.

The notification data 242*g* is data corresponding to a message when gas leakage is notified. A data format of the notification data 242*g* differs depending on a notification method. In the second embodiment, since a message for notifying gas leakage is displayed on the display unit, the notification data is text data, image data, or the like.

Further, although not illustrated, other pieces of execution data are stored in the data area 242. For example, the data area 242 contains data indicating a state of each of the valves 102, 103, 105, and 226 in the sample introduction device 100 in a default state.

The switching program 241*a* is a program for controlling each of the valves 102, 103, 105, and 226 according to the valve data 242*a*.

The pressurization program 241*b* is a program for switching the switching mechanism 110 in a default state to the pressurized state illustrated in FIG. 7A When the pressurization program 241*b* is executed, the pressurizing valve data 242*b* is used.

The pressurization maintenance program 241*c* is a program for switching the switching mechanism 110 in the pressurized state illustrated in FIG. 7A to the pressurization maintenance state illustrated in FIG. 7B when the switching mechanism 110 in a default state is switched to the pressurized state by the pressurization program 241*b* and the switching condition is satisfied. When the pressurization maintenance program 241*c* is executed, the pressurization maintenance valve data 242*c* and the determination data 242*f* are used.

The derivation program 241*d* is a program for switching the switching mechanism 110 in the pressurization maintenance state illustrated in FIG. 7B to the derivation state illustrated in FIG. 7C when the gas leakage detection program 241*g* does not detect gas leakage.

Further, the derivation program 241*d* includes a program for switching the switching mechanism 110 in the derivation state illustrated in FIG. 7C to the derivation state illustrated in FIG. 7D. When the derivation program 241*d* is executed, the derivation valve data 242*d* is used.

The supply program 241*e* is a program for switching the switching mechanism 110 in the derivation state illustrated in FIG. 7D to the supply state illustrated in FIG. 7E. When the supply program 241*e* is executed, the supply valve data 242*e* is used.

The pressure measurement program 241*f* is a program for measuring a pressure value in the pressurized channel by the pressure sensor 228 when the switching mechanism 110 in the pressurized state is switched to the pressurization maintenance state by the pressurization maintenance program 241*c* and when the presence or absence of gas leakage is detected by the gas leakage detection program 241*g*. Note that, when a pressure value in the pressurized channel is measured with the execution of the pressure measurement program 241*f*, pressure value data indicating the pressure value is stored in the data area 242. Further, the pressure measurement program 241*f* may be a program that constantly measures pressure with the pressure sensor 228.

The gas leakage detection program 241*g* is a program for detecting gas leakage when the gas leakage condition is satisfied. The determination data 242*f* is used when the gas leakage detection program 241*g* is executed.

The notification program 241*h* is a program for notifying gas leakage by the notification unit 229 when the gas leakage is detected by the gas leakage detection program 241*g*. When the notification program 241*h* is executed, the notification data 242*g* is used.

Note that, although not illustrated, the program area 241 also includes a control program other than the switching program 241*a*. For example, the program area 241 contains a program for switching the sample introduction device 100 to a default state.

Figure 9:
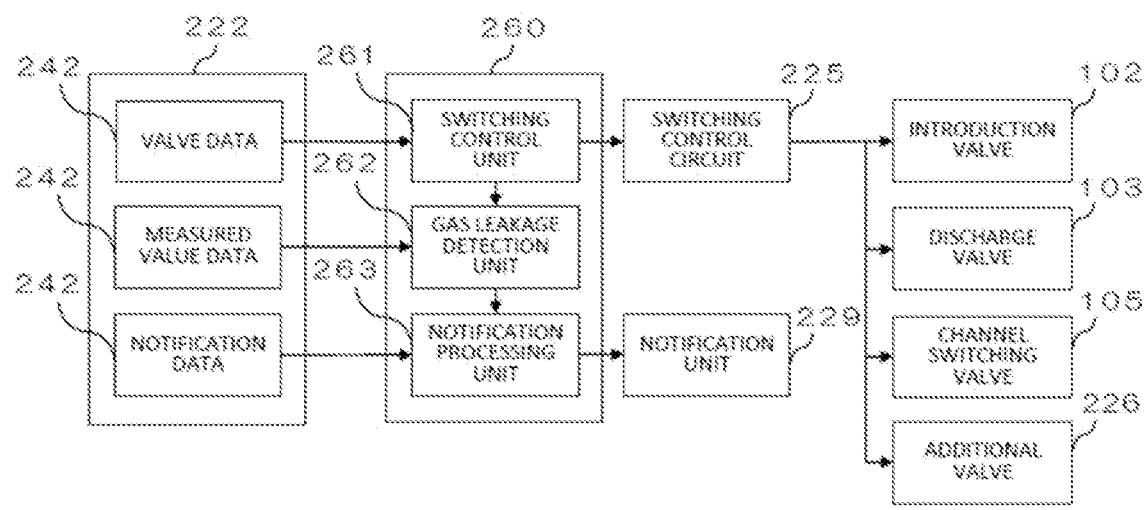
FIG. 9 is a block diagram illustrating an example of a specific electrical configuration of the sample introduction device of the second embodiment.

FIG. 9 is a block diagram illustrating an example of a specific electrical configuration of the sample introduction device 100 of the second embodiment. In the second embodiment, when the CPU 221 executes the switching program 241*a*, a control unit 260 functions as a switching control unit 261 that controls operation of the switching mechanism 110.

Further, when the CPU 221 executes the gas leakage detection program 241*g*, the control unit 260 functions as a gas leakage detection unit 262 that detects gas leakage from the pressurized channel.

Furthermore, when the CPU 221 executes the notification program 241*h*, the control unit 260 functions as a notification processing unit 263 that notifies that gas is leaking.

In the example illustrated in FIG. 9, the control unit 260 functions as the switching control unit 261, the gas leakage detection unit 262, and the notification processing unit 263. For example, when a state of the switching mechanism 110 in the pressurized state is switched to the pressurization maintenance state, the additional valve 226 and the like are controlled by using the valve data 242*a*, specifically, the pressurization maintenance valve data 242*c*.

Furthermore, when the switching mechanism 110 is in the pressurization maintenance state, the presence or absence of gas leakage is detected using the determination data 242*f*. Further, when the gas leakage detection unit 262 detects gas leakage, the notification data 242*g* is used to notify that gas is leaking.

Note that, in the second embodiment, the pressure sensor 228 is used to detect the presence or absence of gas leakage. However, another leak sensor may be used as long as the presence or absence of gas leakage can be detected.

Further, the additional valve 226 may be provided in a connection portion between the resistance pipe 206 and the pipe 203, or the additional valve 226 may be provided integrally with the introduction valve 102.

Furthermore, the detection of the presence or absence of gas leakage in the sample introduction device 100 may be performed at a timing other than during the introduction operation. In this case, apart from the introduction operation, the sample introduction device 100 is switched from the pressurized state to the pressurization maintenance state, and the presence or absence of gas leakage is detected. For example, the presence or absence of gas leakage may be detected automatically and periodically. Alternatively, if the sample introduction device 100 includes the above-mentioned operation unit, the presence or absence of gas leakage may be detected according to the operation of the user. However, if the presence or absence of gas leakage is detected separately from the introduction operation, it is necessary to seal the tip portion of the insertion tube 101 as necessary.

Further, in a case where there is another device communicably connected to the sample introduction device 100, the control as described above may be performed by a control unit included in another device. For example, if the sample introduction device 100 and the gas chromatograph 1 can communicate with each other, a control unit of the gas chromatograph 1 may perform switching of a state of the switching mechanism 110, detection of gas leakage, notification of gas leakage, and the like.

Furthermore, in a case where there is another device communicably connected to the sample introduction device 100, a notification unit included in another device may be used for notification of gas leakage. For example, a display unit included in the gas chromatograph 1 may be used for notification of gas leakage. The same applies similarly in a case where another device includes the sample introduction device 100.

According to the second embodiment, since flow of gas of the resistance pipe 206 is cut off in the pressurization maintenance state, the accuracy of detecting the presence or absence of gas leakage can be improved. Note that, in the first embodiment, the control unit 220 and the switching control circuit 225 in the second embodiment may be provided to control the valves 102, 103 and 105 in the same manner as in the second embodiment.

5. Variation

In the above embodiment, the configuration in which gas is supplied into the pipe 203 from an additional channel including the resistance pipe 206 is described. However, the configuration may be such that gas is supplied into the pipe 203 from an additional channel other than the resistance pipe 206. That is, the additional channel is not limited to one composed of a bypass channel that branches from the pipe 203 on the upstream side of the introduction valve 102 and merges with the pipe 203 again on the downstream side of the introduction valve 102. For example, the configuration may be such that a gas source different from a gas source for supplying carrier gas is provided, and gas is supplied from the gas source into the pipe 203.

Further, the configuration of the additional channel is not limited to one in which gas is supplied into the pipe 203, and may be one in which gas is supplied from an optional position to a channel between the collection unit 104 and the discharge valve 103. For example, the additional channel may be configured to supply gas into the pipe 204.

The switching mechanism 110 for switching a channel is not limited to one composed of the introduction valve 102, the discharge valve 103, and the channel switching valve 105. That is, the configuration and number of valves used in the sample introduction device 100, the configuration of pipes, and the like are not limited to the configuration as in the above embodiment, and may be another optional configuration. The collection unit 104 is not limited to a loop-shaped configuration such as a sample loop as long as the collection unit 104 can collect a component in gas.

5. Aspect

It is to be understood by those skilled in the art that a plurality of exemplary embodiments described above are specific examples of embodiments described below.

(Section 1) A sample introduction device according to one aspect may include:
  an insertion tube inserted into a head space of a sample container;
  a gas supply pipe that can communicate with the insertion tube and pressurizes the head space to a predetermined pressure by supplying gas into the sample container via the insertion tube;
  a collection unit that can communicate with the insertion tube and collects a component in gas derived from the head space;
  a discharge pipe that can communicate with the insertion tube via the collection unit; and
  a switching mechanism that can perform switching to a pressurized state in which gas is supplied from the gas supply pipe to the insertion tube, or a derivation state in which gas in the head space that is pressurized is derived from the insertion tube to the discharge pipe via the collection unit.

The switching mechanism may include a discharge valve that puts the insertion tube and the discharge pipe into a non-communication state in the pressurized state, and puts the insertion tube and the discharge pipe into a communication state in the derivation state.

The sample introduction device may further include an additional channel for supplying gas to a channel between the collection unit and the discharge valve in the derivation state.

According to the sample introduction device described in Section 1, it is possible to prevent a component remaining in a channel from diffusing to the collection unit side by gas supplied from the additional channel in the derivation state in which gas in the pressurized head space is derived from the insertion tube to the discharge pipe via the collection unit.

(Section 2) In the sample introduction device described in Section 1,
  the additional channel may supply gas to a channel between the collection unit and the discharge valve at a pressure lower than the predetermined pressure and higher than a pressure inside the discharge pipe.

According to the sample introduction device described in Section 2, it is possible to effectively prevent a component remaining in a channel from diffusing to the collection unit side since gas is supplied from the additional channel at an optimum pressure.

(Section 3) In the sample introduction device described in Section 1, the additional channel may include a resistance pipe branched from the gas supply pipe.

According to the sample introduction device described in Section 3, since the additional channel can be configured by using the resistance pipe branched from the gas supply pipe, it is not necessary to separately provide a gas source.

Therefore, at low cost, it is possible to prevent a component remaining in a channel from diffusing to the collection unit side.

(Section 4) In the sample introduction device described in claim 3, the switching mechanism may include an additional valve capable of opening and closing the resistance pipe.

According to the sample introduction device described in Section 4, flow of gas in the resistance pipe can be cut off.

(Section 5) The sample introduction device described in Section 4, may further include: a switching control unit that controls operation of the switching mechanism.

The switching control unit may set a pressurization maintenance state by putting the resistance pipe into a closed state with the additional valve in a state where supply of gas from the gas supply pipe to the insertion tube is stopped after the pressurized state.

According to the sample introduction device described in Section 5, a pressure in the pressurized channel can be maintained.

(Section 6) The sample introduction device described in Section 5 may further include: a gas leakage detection unit that detects gas leakage from a pressurized channel in the pressurization maintenance state.

According to the sample introduction device described in Section 6, the presence or absence of gas leakage can be detected.

(Section 7) The sample introduction device described in Section 6 may further include: a notification processing unit that notifies detection of gas leakage in a case where the gas leakage is detected by the gas leakage detection unit.

According to the sample introduction device described in Section 7, it is possible to notify that gas is leaking.

(Section 8) In the sample introduction device described in Section 1, the collection unit may be arranged in a heating region, and the discharge valve may be arranged outside the heating region.

According to the sample introduction device described in Section 8, a component in gas is likely to be adsorbed and remain in the discharge valve arranged outside the heating region and a channel immediately before the discharge valve. Even in such a case, it is possible to prevent a component remaining in a channel between the collection unit and the discharge valve from diffusing to the collection unit side by supplying gas from the additional channel to the channel.

(Section 9) In the sample introduction device described in Section 8, the additional channel may communicate with a channel between the collection unit and the discharge valve in the heating region.

According to the sample introduction device described in Section 9, it is possible to prevent a component remaining in a channel further on the downstream side than the heating region from diffusing to the collection unit side, since gas can be supplied from the additional channel to the channel.

DESCRIPTION OF REFERENCE SIGNS 1 gas chromatograph
2 sample container
3 heating region
4 component
23 head space
100 sample introduction device
101 insertion tube
102 introduction valve
103 discharge valve
104 collection unit
105 channel switching valve
110 switching mechanism
201 to 204, 207 pipe
205 branch portion
206 resistance pipe
226 additional valve
262 gas leakage detection unit
263 notification processing unit

The invention claimed is:

1. A sample introduction device comprising:
an insertion tube inserted into a head space of a sample container;
a gas supply pipe that can communicate with the insertion tube and pressurizes the head space to a predetermined pressure by supplying gas into the sample container via the insertion tube;
a collection unit that can communicate with the insertion tube and collects a component in gas derived from the head space;
a discharge pipe that can communicate with the insertion tube via the collection unit; and
a plurality of valves configured to perform switching between a pressurized state in which gas is supplied from the gas supply pipe to the insertion tube and a derivation state in which gas in the head space that is pressurized is derived from the insertion tube to the discharge pipe via the collection unit, wherein
the plurality of valves includes a discharge valve that puts the insertion tube and the discharge pipe into a non-communication state in the pressurized state, and puts the insertion tube and the discharge pipe into a communication state in the derivation state, the sample introduction device further comprising:
an additional channel for supplying gas to a channel formed by the gas supply pipe or a pipe that connects the gas supply pipe to the discharge pipe between the collection unit and the discharge valve in the derivation state, wherein
the plurality of valves includes an introduction valve,
the additional channel supplies gas to the channel between the collection unit and the discharge valve at a pressure lower than the predetermined pressure and higher than a pressure inside the discharge pipe, and
the additional channel branches from the gas supply pipe on an upstream side of the introduction valve and merges with the gas supply pipe on a downstream side of the introduction valve.

2. The sample introduction device according to claim 1, wherein
the additional channel includes a resistance pipe branched from the gas supply pipe.

3. The sample introduction device according to claim 2, wherein
an additional valve in addition to the plurality of valves, the additional valve capable of opening and closing the resistance pipe.

4. The sample introduction device according to claim 3, further comprising:
a switching control unit that controls operation of the plurality of valves, wherein
the switching control unit sets a pressurization maintenance state by putting the resistance pipe into a closed state with the additional valve in a state where supply of gas from the gas supply pipe to the insertion tube is stopped after the pressurized state.

5. The sample introduction device according to claim 4, further comprising:
a gas leakage detection unit that detects gas leakage from a pressurized channel in the pressurization maintenance state.

6. The sample introduction device according to claim 5, further comprising:
a notification processing unit that notifies detection of gas leakage in a case where the gas leakage is detected by the gas leakage detection unit.

7. The sample introduction device according to claim 1, wherein
the collection unit is arranged in a heating region, and
the discharge valve is arranged outside the heating region.

8. The sample introduction device according to claim 7, wherein
the additional channel communicates with the channel formed by the gas supply pipe or a pipe that connects the gas supply pipe to the discharge pipe between the collection unit and the discharge valve in the heating region.

9. A sample introduction device comprising:
an insertion tube inserted into a head space of a sample container;
a gas supply pipe that can communicate with the insertion tube and pressurizes the head space to a predetermined pressure by supplying gas into the sample container via the insertion tube;
a collection unit that can communicate with the insertion tube and collects a component in gas derived from the head space;
a discharge pipe that can communicate with the insertion tube via the collection unit; and
a plurality of valves configured to perform switching between a pressurized state in which gas is supplied from the gas supply pipe to the insertion tube and a derivation state in which gas in the head space that is pressurized is derived from the insertion tube to the discharge pipe via the collection unit, wherein
the plurality of valves includes a discharge valve that puts the insertion tube and the discharge pipe into a non-communication state in the pressurized state, and puts the insertion tube and the discharge pipe into a communication state in the derivation state, the sample introduction device further comprising:
an additional channel for supplying gas to a channel formed by the gas supply pipe or a pipe that connects the gas supply pipe to the discharge pipe between the collection unit and the discharge valve in the derivation state, wherein
the additional channel supplies gas to the channel between the collection unit and the discharge valve at a pressure lower than the predetermined pressure and higher than a pressure inside the discharge pipe, and
the additional channel includes a resistance pipe branched from the gas supply pipe.

10. The sample introduction device according to claim 9, wherein
an additional valve in addition to the plurality of valves, the additional valve capable of opening and closing the resistance pipe.

11. The sample introduction device according to claim 10, further comprising:

a switching control unit that controls operation of the plurality of valves, wherein
the switching control unit sets a pressurization maintenance state by putting the resistance pipe into a closed state with the additional valve in a state where supply of gas from the gas supply pipe to the insertion tube is stopped after the pressurized state.

12. The sample introduction device according to claim 11, further comprising:
a gas leakage detection unit that detects gas leakage from a pressurized channel in the pressurization maintenance state.

13. The sample introduction device according to claim 12, further comprising:
a notification processing unit that notifies detection of gas leakage in a case where the gas leakage is detected by the gas leakage detection unit.

14. A sample introduction device comprising:
an insertion tube inserted into a head space of a sample container;
a gas supply pipe that can communicate with the insertion tube and pressurizes the head space to a predetermined pressure by supplying gas into the sample container via the insertion tube;
a collection unit that can communicate with the insertion tube and collects a component in gas derived from the head space;
a discharge pipe that can communicate with the insertion tube via the collection unit; and
a plurality of valves configured to perform switching between a pressurized state in which gas is supplied from the gas supply pipe to the insertion tube and a derivation state in which gas in the head space that is pressurized is derived from the insertion tube to the discharge pipe via the collection unit, wherein
the plurality of valves includes a discharge valve that puts the insertion tube and the discharge pipe into a non-communication state in the pressurized state, and puts the insertion tube and the discharge pipe into a communication state in the derivation state, the sample introduction device further comprising:
an additional channel for supplying gas to a channel formed by the gas supply pipe or a pipe that connects the gas supply pipe to the discharge pipe between the collection unit and the discharge valve in the derivation state, wherein
the additional channel supplies gas to the channel between the collection unit and the discharge valve at a pressure lower than the predetermined pressure and higher than a pressure inside the discharge pipe,
the collection unit is arranged in a heating region, and
the discharge valve is arranged outside the heating region.

15. The sample introduction device according to claim 14, wherein
the additional channel communicates with the channel formed by the gas supply pipe or a pipe that connects the gas supply pipe to the discharge pipe between the collection unit and the discharge valve in the heating region.

\* \* \* \* \*